United States Patent
Terahara et al.

(10) Patent No.: US 6,862,134 B2
(45) Date of Patent: *Mar. 1, 2005

(54) DISTRIBUTED OPTICAL AMPLIFIER, AMPLIFYING METHOD, AND OPTICAL COMMUNICATION SYSTEM

(75) Inventors: Takafumi Terahara, Kawasaki (JP); Takeshi Hoshida, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/321,522

(22) Filed: Dec. 18, 2002

(65) Prior Publication Data

US 2003/0123139 A1 Jul. 3, 2003

Related U.S. Application Data

(62) Division of application No. 09/695,187, filed on Oct. 25, 2000, now Pat. No. 6,512,628.

(30) Foreign Application Priority Data

Mar. 6, 2000 (JP) ........................ 2000-061202

(51) Int. Cl.⁷ ................................................ H01S 3/00
(52) U.S. Cl. ....................................................... 359/334
(58) Field of Search ........................................ 359/334

(56) References Cited

U.S. PATENT DOCUMENTS

| | | | |
|---|---|---|---|
| 5,058,974 A | 10/1991 | Mollenauer | 385/27 |
| 5,083,874 A * | 1/1992 | Aida et al. | 385/24 |
| 5,392,377 A | 2/1995 | Auracher | 385/24 |
| 5,532,868 A * | 7/1996 | Gnauck et al. | 359/332 |
| 5,812,710 A | 9/1998 | Sugaya | 385/27 |
| 5,991,477 A * | 11/1999 | Ishikawa et al. | 385/24 |
| 6,031,660 A | 2/2000 | Park et al. | 385/27 |
| 6,055,092 A | 4/2000 | Sugaya et al. | 359/134 |
| 6,188,508 B1 | 2/2001 | Horiuchi et al. | 359/334 |
| 6,292,288 B1 | 9/2001 | Akasaka et al. | 359/334 |
| 6,323,993 B1 | 11/2001 | Hansen et al. | 359/337 |
| 6,626,591 B1 * | 9/2003 | Bellotti et al. | 398/79 |

FOREIGN PATENT DOCUMENTS

| | | | |
|---|---|---|---|
| JP | 3-13836 A | 1/1991 | G01M/11/02 |
| JP | 6-308548 | 4/1994 | G02F/1/35 |
| JP | 10-022931 | 1/1998 | H04B/10/17 |
| JP | 10-073852 | 3/1998 | G02F/1/35 |

OTHER PUBLICATIONS

Takachio, N., et al., "32 x 10 Gb/s distributed Raman amplification transmission with 50–GHz channel spacing in the zero–dispersion region over 640 km of 1.55-$\mu$m dispersion–shifted fiber," Network Innovation Laboratories, (OFC–99PD) pp. PD9–1–3. 1999.

Hansen, P.B., et al.. "Dense wavelength–division multiplexed transmission in 'zero–dispersion' DSF by means of hybrid Raman/erbium–doped fiber amplifiers," Bell Labs/Lucent Technologies (OFC–99PD), pp. PD8–1–3. 1999.

(List continued on next page.)

Primary Examiner—Thomas G. Black
Assistant Examiner—Deandra M. Hughes
(74) Attorney, Agent, or Firm—Staas & Halsey LLP

(57) ABSTRACT

A distributed optical amplifier comprises an optical amplifying medium for distributed optical amplification, light supplying means for supplying a pump light to said optical amplifying medium, a pump light detecting part for detecting optical power of said pump light, adjusting means for adjusting an incident power of the light amplified with said optical amplifying medium, and control means for adjusting incident optical power of said light according to an output of said pump light detecting means. Because of this, the present invention can be controlled with a simplified structure of an optical power of an pump light, and an optical power of light to be amplified. A distributed optical amplifier as such can, for example, be applied in optical transmission systems.

15 Claims, 18 Drawing Sheets

OTHER PUBLICATIONS

Inoue, K., et al., "Fiber Four–Wave Mixing in Multi–Amplifier Systems with Nonuniform Chromatic Dispersion," J. Lightwave Technol., vol. 13, No. 1 (Jan. 1995), pp. 88–93.

Kidorf, H., et al., "Pump Interactions in a 100–nm Bandwidth Raman Amplifier," IEEE Photonics Technol. Letters, vol. 11, No. 5 (May 1999) pp. 530–532.

Bjarklev, Anders, "Optical Fiber Amplifiers: Design and System Applications", Artech House, 1993, pp. 321–353.

Becker, et al., "Erbium–Doped Fiber Amplifiers Fundamentals and Technology", Academic Press, 1999, pp. 293–303.

H. Suzuki et al., "50 GHz spaced, 32 x 10Gbit/s Dense WDM Transmission in Zero–dispersion Region Over 640km of Dispersion–shifted Fibre with Multiwavelength Distributed Raman Amplification", Electronics Letters, vol. 35, No. 14, Jul. 8, 1999, pp. 1175–1176, XP006012357.

R. Ohhira et al., "40 Gbit/s X 8–ch NRZ WDM Transmission Experiment Over 80 km X 5–SPAN Using Distributed Raman Amplification in RDF", $25^{th}$ European Conference On Optical Communication (ECOC'99), Sep. 26–30, 1999, pp. ll–176–ll177, XP001035427, Nice, France.

EP01104594–European Search Report, May 25, 2004.

* cited by examiner

DISTRIBUTED OPTICAL AMPLIFIER, AMPLIFYING METHOD, AND OPTICAL COMMUNICATION SYSTEM

This application is a divisional of application Ser. No. 09/695,187, now U.S. Pat. No. 6,512,628, filed Oct. 25, 2000.

BACKGROUND OF THE INVENTION

1. Field of the Invention

The present invention relates to a distributed optical amplifier and a distributed optical amplifying method for adjusting an incident power of the light to be amplified depending on the optical power of pump light, considering the non-linear optical effects generated in the light to be amplified.

Moreover, the present invention relates to an optical communication system that can improve the transmission characteristic by utilizing such distributed optical amplifier.

An ultra-long distance and large capacity optical communication apparatus is now requested, aiming at establishment of future multimedia network. Development and research are continued for wavelength-division multiplexing (hereinafter abbreviated as "WDM") as the system to realize large capacity transmission system from the advantageous viewpoint of wide frequency band of optical fiber and effective use of large capacity.

Particularly, in the ultra-long distance optical communication system, since the WDM optical signal is attenuated during transmission through the optical transmission line, the WDM signal must be amplified.

2. Description of the Related Art

The optical communication system of the related art comprises a transmitting terminal for generating the WDM optical signal formed by wavelength-division multiplexing of a plurality of optical signals of different wavelengths, an optical transmission line for transmitting the WDM optical signal transmitted from the transmitting terminal and receiving terminal and a receiving terminal for receiving the transmitted WDM optical signal and moreover this optical communication system also comprises, as required, one or a plurality of repeaters having the function to amplify the WDM optical signal in the course of the optical transmission line.

In such optical communication system, waveform of each optical signal is deteriorated due to the non-linear optical effects in the optical transmission line. In order to eliminate deterioration of waveform, it is effective to reduce the optical power (optical intensity) of the WDM optical signal incident to the optical transmission line, but reduction of optical power results in deterioration of signal to noise ratio (hereinafter, referred to as "optical SNR"). As the non-linear optical effects, for example, self phase modulation (hereinafter, referred to as "SPM"), cross-phase modulation (hereinafter, referred to as "XPM"), four-wave mixing (hereinafter, referred to as "FWM"), stimulated Raman scattering (hereinafter, referred to as "SRS") and stimulated Brillouin scattering (hereinafter, referred to as "SBS") are known.

For this purpose, it has been proposed to use in combination a centralized optical amplifier provided within a repeater and a distributed optical amplifier using the optical transmission line in common as the optical amplifying medium. For example, effectiveness of the Raman amplification is reported in P. B. Hansen, A. Stentz, T. N. Nielsen, R. Espinodola, L. E. Nelson, A. A. Abramov, "Dense wavelength-division multiplexed transmission in "zero-dispersion" DSF by means of hybrid Raman/erbium-doped fiber amplifier" (OFC/100C. '99), PD8, 19999 and N. Takachio, H. Suzuki, H. Masuda and M. Koga "32*10 Gb/s distributed Raman amplification transmission with 50-GHz channel spacing in the zero-dispersion region over 640 km of 1.55-$\mu$m, dispersion-shifted fiber" (OFC/100C '99), PD9, 1999.

Moreover, the Japanese Published Unexamined Patent Application No. HEI 03-013836 (Japanese Patent Application No. HEI 01-149148) discloses a method of Raman amplification by obtaining loss of the optical transmission line through detection of rear scattering of the incident test light to the optical transmission line.

The Japanese Published Unexamined Patent Application No. HEI 10-073852 (Japanese Patent Application No. HEI 08-232376) discloses the Raman amplification in the widened amplification band using a plurality of pump lights in different wavelengths.

The Japanese Published Unexamined Patent Application No. HEI 10-073852 (Japanese Patent Application No. HEI 08-170183) discloses inclusion of a pump light source for Raman amplification within a repeater.

Here, an optical amplifier may be classified into a centralized optical amplifier and a distributed optical amplifier. The centralized optical amplifier is an optical amplifier wherein an optical amplifying medium and a pump light source are centralized in one area. For example, a semiconductor laser amplifier and an optical fiber amplifier that is formed by winding an optical fiber as an amplifying medium around a bobbin are well known. On the other hand, the distributed optical amplifier is an optical amplifier wherein an optical amplifying medium is laid for a constant distance and the pump light source is provided in one or both areas. For example, an optical fiber amplifier is proposed. As an optical fiber amplifier, rare-earth element added optical fiber amplifier and an optical fiber amplifier utilizing the non-linear scattering in the optical fiber are proposed.

These centralized optical amplifier and distributed optical amplifier are identical in the physical process to amplify the optical signal but are mainly different in such a point that the optical amplifying medium is summarized within one area or is distributed for a constant distance. The distributed optical amplifier is characterized in that the optical amplifying medium can also be used as the inter-terminal optical transmission line for transmitting the optical signal.

Moreover, as the non-linear scattering, SRS and SBS are known. SRS is the scattering generated due to the mutual effect of optical phonon of lattice vibration and has wide gain width and large frequency shift. While, SBS is the scattering generated due to the mutual effect of acoustic phonon of lattice vibration and has gain width narrower than that of SRS and small frequency shift but has the gain efficient larger than that by two digits or more.

The optical fiber amplifier using the non-linear scattering is characterized in that an ordinary optical fiber such as NZ-DSF and SMF can be used, the pumping wavelength can be set for any amplification wavelength and gain is matched in the polarizing direction of the pump light. As the ordinary optical fibers, for example, distributed shift fiber (hereinafter, abbreviated as "DSF"), non-zero distributed shift optical fiber (hereinafter, abbreviated as "NZ-DSF"), distributed flat optical fiber (hereinafter, abbreviated as "DFF") and 1.3 $\mu$m zero-distributed (normal distribution) single mode optical fiber (hereinafter, abbreviated as "SMF") are proposed.

The references cited above disclose the Raman amplification but does not disclose the practical method how to control the optical power of the pump light and the optical power of light to be amplified with the distributed optical amplifier. Otherwise, if such reference discloses the practical method for such control, such reference requires a complicated circuit for the control of optical power.

SUMMARY OF THE INVENTION

An object the present invention is to provide a distributed optical amplifier that can control the optical power of pump light and the optical power of the light to be amplified with a simplified structure.

Another object of the present invention is to provide an optical power control method that is just suitable for this distributed optical amplifier.

Still another object of the present invention is to provide an optical communication system utilizing this distributed optical amplifier.

The above objects can be accomplished by a distributed optical amplifier comprising: optical amplifying medium for distributed optical amplification; light supplying part for supplying a pump light to the optical amplifying medium; a pump light detecting part for detecting optical power of the pump light; adjusting part for adjusting an incident power of the light amplified with the optical amplifying medium; and control part for adjusting incident optical power of the light according to an output of the pump light detecting part.

A control part of distributed optical amplifier as such controls the incident optical power according to a correspondence relationship between the incident optical power and the output of the pump light detecting part, or controls the exit optical power at the incident end of the pump light to less than the optical power that generates a predetermined waveform deterioration with the non-linear optical effects depending on the optical amplifying medium, when the light is incident under the condition that the pump light is supplied to the optical amplifying medium. A distributed optical amplifier as such may, for example, use an optical transmission line as an optical amplifying medium, or supply a pump light from a plurality of parts. Also, a distributed optical amplifier as such may, for example, further comprise a residual pump light detecting part for detecting optical power of residual pump light or an amplified light detecting part for detecting optical power of amplified light.

Also, the above objects may be accomplished by an optical communication system for transmitting an optical signal between a couple of terminals, comprising: an optical transmission line for transmitting the optical signal along with performing distribution amplifying; light supplying part for supplying a pump light to the optical transmission line; a pump light detecting part for detecting optical power of the pump light; adjusting part for adjusting an incident power of the light amplified with the optical amplifying medium; and control part for adjusting incident optical power of the light according to an output of the pump light detecting part.

Moreover, the above object may be accomplished by an optical communication system, comprising: a transmitting terminal for outputting wavelength-multiplexed optical signal; an optical transmission line for inputting an output light from the transmitting terminal; and pumping part for inserting a pump light for pumping the optical transmission line to the output end side of the optical transmission line to perform stimulated Raman amplification in the optical transmission line. An optical system as such may, for example, set the optical power of the optical signal output from the transmitting terminal to a value less than a value that actually generates crosstalk by four-wave mixing at the output end of the optical transmission line, or, to a value less than a value that actually generates the predetermined waveform deterioration due to cross-phase modulation at the output end of the optical transmission line. Moreover, in cases like these, stimulated Brillouin scattering and signal to noise ratio are considered.

In such distributed-optical amplifier and optical communication system, the correspondence relationship of incident optical power for the pump light is previously determined so that the light to be amplified should not generate the non-linear optical effects higher than the predetermined range in the optical amplifying medium. The control part adjusts the incident optical power with the adjusting part according to the correspondence relationship depending on an output of the pump light detecting part for detecting the excited optical power. Therefore, when the optical signal is amplified with such distributed optical amplifier and optical communication system, the optical signal in which waveform deterioration is controlled within the predetermined design range. When the light is amplified again with the centralized optical amplifier after it is amplified first with the distributed optical amplifier, an optical signal of large optical power can be incident to the centralized optical amplifier. Therefore, the total optical SNR in the distributed optical amplifier and centralized optical amplifier can be much improved. This way, this optical transmission system makes ultra-long distance communication possible.

Such distributed optical amplifier can control the waveform deterioration and optical SNR with the simplified structure of the pump light detecting part, adjusting part and control part.

BRIEF DESCRIPTION OF THE DRAWINGS

The nature, principle, and utility of the invention will become more apparent from the following detailed description when read in conjunction to with the accompanying drawings in which like parts are designated by identical reference numbers, in which.

DESCRIPTION OF THE PREFERRED EMBODIMENTS

Figure 1:
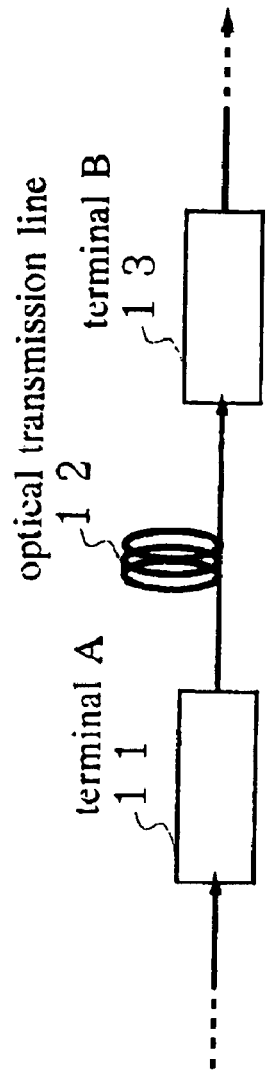
FIG. 1 is a diagram illustrating a structure of the optical communication system of the first embodiment.

Next, the preferred embodiments of the present invention will be explained in detail with reference to the accompanying drawings.

In each figure, the like structural elements are designated with the like reference numerals, and duplicated explanations are not repeated.

(Structure of the First Embodiment)

FIG. 1 is a diagram illustrating a structure of an optical communication system as the first embodiment.

Figure 2:
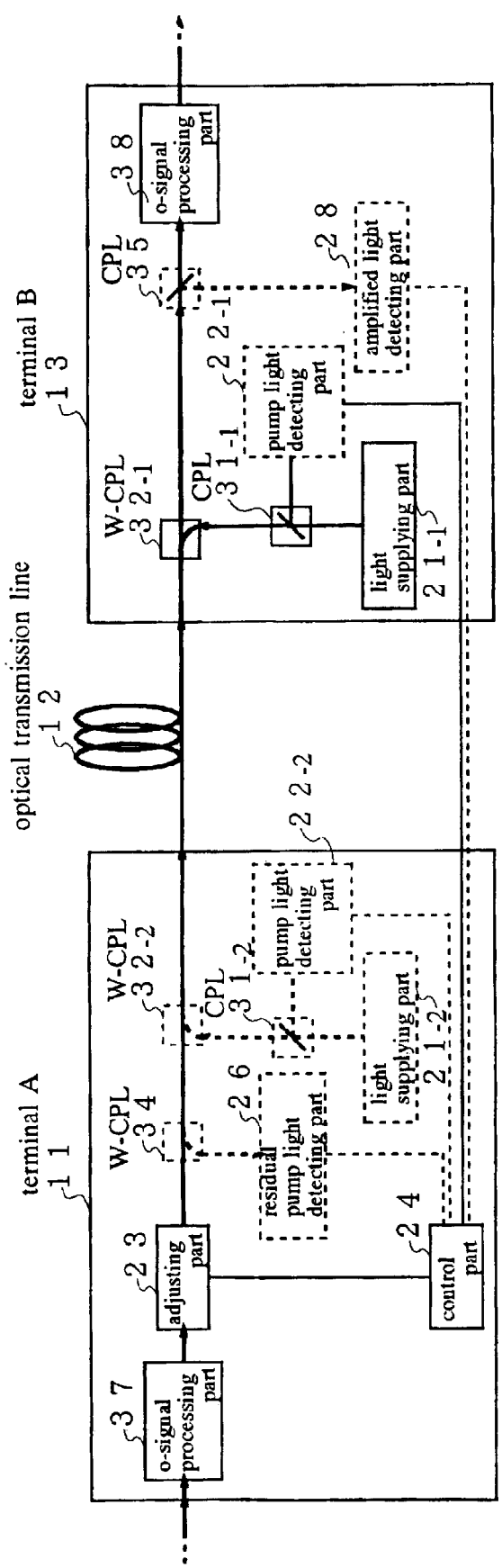
FIG. 2 is a diagram illustrating a structure of the distributed optical amplifier of the first embodiment.

FIG. 2 is a diagram illustrating a structure of a distributed optical amplifier as the first embodiment.

In FIG. 1, the terminal A 11 transmits the WDM optical signal consisting of a plurality of wavelength-multiplexed optical signals to the terminal B 13 through the optical transmission line 12.

In FIG. 2, the WDM optical signal incident to the terminal A 11 is then incident to an optical signal processing part 37.

The optical signal processing part 37 is formed with inclusion of an optical amplifier and a dispersion compensator when the terminal A 11 is an optical repeater for reproducing and repeating the WDM optical signal and is formed with inclusion of an optical add/drop multiplexer when the terminal A 11 is an optical repeater having the function to add•drop•transmit the optical signal wavelength-multiplexed from the WDM optical signal. In the case where the terminal A 11 is an optical transmitting terminal to generate by itself the WDM optical signal without input of the WDM optical signal, the optical signal processing part 37 is formed with inclusion of a plurality of optical transmitter to generate optical signal, a WDM coupler (W-CPL) for wavelength-multiplexing a plurality of optical signals and an optical amplifier to amplify the WDM optical signal. Moreover, the terminal A 11 is in some cases not provided with the optical signal processing part 37.

Here, the optical amplifier of the optical signal processing part 37 explained above is a centralized optical amplifier consisting of a semiconductor laser amplifier and rare-earth added optical fiber amplifier. For the rare-earth added optical fiber amplifier, the rare-earth element to be added is selected considering the wavelength band to be amplified. For instance, the wavelength-band of 1550 nm is to be amplified, the erbium element is added to the optical fiber. This erbium element is one of the lanthanoide rare-earth elements having element code Er and atomic number 68. The elements belonging to lanthanoide are similar in the property with each other. As the rare-earth elements for amplifying the other wavelength band, neodymium (Nd, 1060 nm wavelength band, 1300 nm wavelength band), praseodymium (Pr, 1300 nm wavelength band) and thulium (Tm, 1450 nm wavelength band) are known.

The WDM optical signal emitted from the optical signal processing part 37 is the incident to an adjusting part 23. The adjusting part 23 adjusts the incident power of light to be amplified with an optical transmission line as the optical amplifying medium depending on an output of a control part 24 explained later.

The WDM optical signal emitted from the adjusting part 23 is transmitted to the optical transmission line 12 from the terminal A. The optical transmission line 12 is an optical amplifying medium for the distributed optical amplification and the optical transmission line laid between a couple of terminals. Namely, the optical transmission line 12 also has the function to transmit the WDM optical signal to the terminal B 13.

The WDM optical signal emitted from the optical transmission line 12 is then incident to the optical signal processing part 38 via a WDM coupler 32-2.

When the terminal B 13 is an optical repeater, the optical signal processing part 38 is formed, like the terminal A 11, with inclusion of the optical amplifier and dispersion compensator or inclusion of the optical add/drop multiplexer. When the terminal B 13 is an optical receiving terminal, the optical signal processing part 38 is formed with inclusion of the optical amplifier to amplify the WDM optical signal, the WDM coupler to isolate the amplified WDM optical signal to each optical signal and a plurality of optical receiver to receive the optical signal. Moreover, the terminal B 13 is not provided, in some cases, with the optical signal processing part 38. As the WDM coupler, for example, a dielectric material multi-layer film filter that is one of the interference filters and an arrayed waveguide grating (AWG) can be used. The WDM coupler can also be used as will be explained later.

On the other hand, a light supplying part 21-1 is a pump light source to supply the pump light to the optical transmission line 12 as the optical amplifying medium.

The pump light emitted from this light supplying part 21-1 is then incident to a coupler (CPL) 31-1. The coupler 31-1 branches this pump-light into a couple of lights. One of the branched pump lights is then emitted to a pump light detecting part 22-1, while the other pump light is then supplied to the optical transmission line 12 via the WDM coupler 32-2. A branching ratio of the coupler 31-1 is provided to allow the light of a large amount to enter the optical transmission line 12 (WDM coupler 32-1) in the ratio such as 10:1.

The pump light detecting part 22-1 detects the optical power of the pump light. Its output is then input to the control part 24 in the terminal A 11.

The control part 24 adjusts the incident power of the light according to the correspondence relationship between the incident optical power predetermined depending on an output of the pump light detecting part 22-1 and an output of the pump light detecting part 22-1. Adjustment of this incident optical power is realized by outputting the control signal to the adjusting part 23 from the control part 24.

As explained above, the distributed optical amplifier in this first embodiment is formed of the optical transmission line 12, light supplying part 21-1, pump light detecting part 32-1, adjusting part 23 and control part 24.

In the first embodiment, the control part 24 is provided in the terminal A 11, but it can also be provided in the terminal B 13. Moreover, it is also possible to introduce the structure that a terminal for centralized monitoring of optical communication system, for example, is provided in addition to the terminals A 11 and B 13 and the control part 24 is provided in this additional terminal.

Such optical communication system between a couple of terminals takes the profile observed in a part of the optical communication network such as the point-to-point, star type, ring type and hierarchical type and mesh type networks.

Here, the correspondence relationship between the incident optical power previously stored in the control part 24 and an output of the pump light detecting part 22-1 will be explained.

Figure 3:
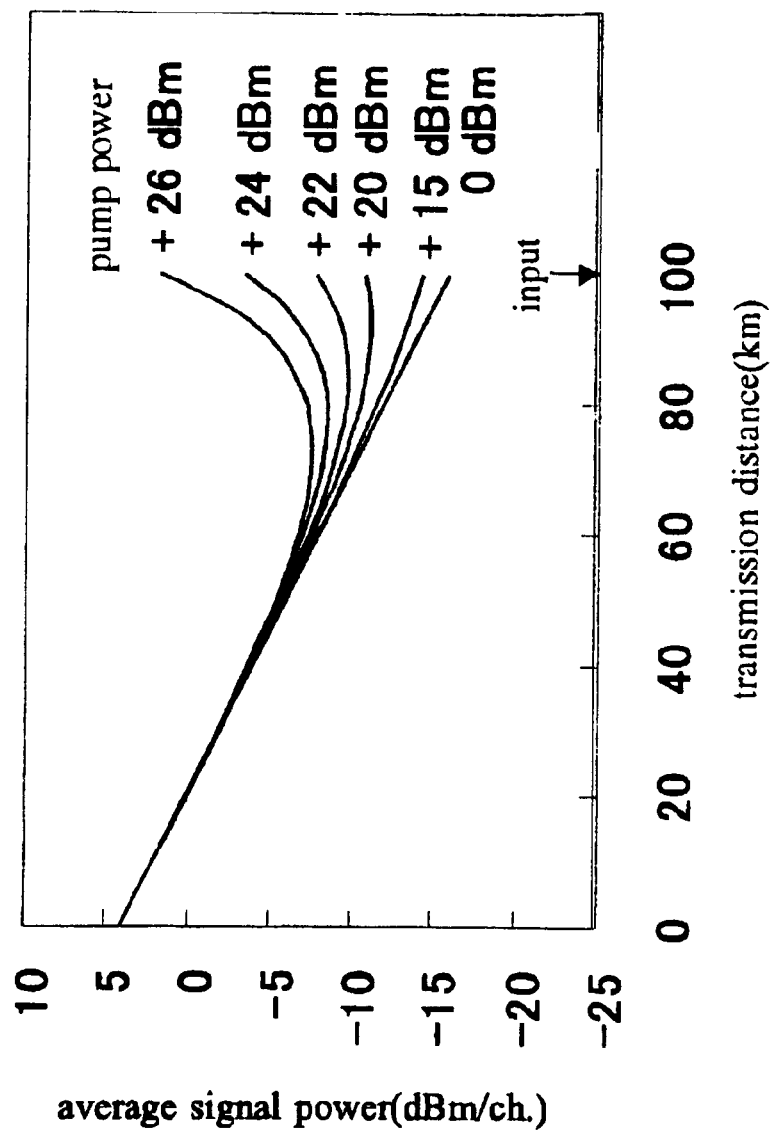
FIG. 3 is a diagram illustrating the relationship between the transmission distance and average optical signal power by the Raman amplification.

FIG. 3 is a diagram illustrating the relationship between transmission distance and average optical signal power by the Raman amplification.

In FIG. 3, the lateral axis designates the transmission distance in unit of km, while the vertical axis designates the average optical power of signal per channel. Hereinafter, channel is abbreviated as "ch.".

FIG. 3 illustrates the simulation result, in FIG. 1 and FIG. 2, under the condition that the 32-wave WDM optical signal is incident to the terminal A 11 and specifications of each structure are determined as follow.

First, the 32-wave WDM optical signal is allocated in the wavelength band of 1535 nm to 1561 nm with the wavelength spacing of 0.8 nm (100 GHz) and the average optical power of each signal is +3 dBm/ch. This value is a limit value not generating the stimulated Brillouin scattering (SBS) among the non-linear optical effects generated in the optical fiber used as the optical transmission line.

The optical signal processing parts 37, 38 are designed as the erbium element added optical fiber amplifier (hereinafter, abbreviated as "EDFA") and the adjusting part 23 and control part 24 do not operate. Namely, the terminal A 11 has the structure identical to that not provided with the adjusting part 23 and control part 24.

The optical transmission line 12 is NZ-DSF having the characteristics that the loss is 0.20 dB/km for signal wavelength and 0.25 dB/km for excited wavelength, effective cross-sectional area is 55 $\mu m^2$, non-linear refractive index is $2.6 \times 10^{-20}$ m$^2$/W, dispersion coefficient is 5 ps/nm/km (in the case of 1.55 $\mu$m band), dispersion slope is 0.05 ps/nm$^2$/km. The light supplying part 21-1 supplies the laser beam of 1.45 $\mu$m band as the pump light for the Raman amplification to the optical transmission line 12 as the amplifying medium.

FIG. 3 illustrates the result of calculation conforming to the Expression 1 to obtain the Raman Amplification under the conditions explained above by changing the optical power of the pump light supplied with the light supplying part 21-1. In FIG. 3, each solid line indicates, in the sequence from the lower side, the optical power of the pump light of $-\infty$dBm, +15 dBm, +20 dBm, +22 dBm, +24 dBm and +26 dBm. The solid line of $-\infty$dBm indicates the optical transmission line loss characteristic when the optical power of pump light is "0" and the Raman amplification is not performed.

$$\frac{dP_f(z, \nu)}{dz} = -\alpha(\nu)P_f(z, \nu) + \gamma(\nu)P_b(z, \nu) +$$

$$\int_{\zeta > \nu} \left\{ \frac{gr}{Aeff}(\nu - \zeta)[P_f(z, \zeta) + P_b(z, \zeta)]P_f(z, \nu) + 2h\nu \frac{gr}{Aeff}(\nu - \zeta)[P_f(z, \zeta) + P_b(z, \zeta)] \times \left(1 + \frac{1}{e^{h(\zeta - \nu)/kT} - 1}\right) \right\} d\zeta -$$

$$\int_{\zeta < \nu} \left\{ \frac{gr}{Aeff}(\nu - \zeta)[P_f(z, \zeta) + P_b(z, \zeta)]P_f(z, \nu) + 2h\nu \frac{gr}{Aeff}(\nu - \zeta)[P_f(z, \zeta) + P_b(z, \zeta)] \times \left(1 + \frac{1}{e^{h(\zeta - \nu)/kT} - 1}\right) \right\} d\zeta$$

[Expression 1]

Here, nf (z, $\nu$) designates forward power (all lights propagated in the forward direction of optical transmission line) at frequency $\nu$ at distance z; nb(z, $\nu$) backward power (all lights propagated in the backward direction of optical transmission line) at frequency $\nu$ at distance z; $\alpha(\nu)$, attenuation in the frequency $\nu$; $\gamma(\nu)$, Rayleigh scattering coefficient in the frequency $\nu$; gr($\Delta \nu$)gr($\xi$-$\nu$), Raman gain coefficient between the frequencies $\xi$ and $\nu$; Aeff, effective area of optical transmission line 12; h, Planck's constant; k, Boltzmann's constant; T, temperature of the optical transmission line 12.

As will be understood from FIG. 3, as the excited optical power increases, the optical signal power after transmission of about 100 km also increases, but because of the backward pumping, the Raman amplification is not almost generated in the range from the incident end of optical transmission line (point where the transmission distance is 0 km) to the point of about 50 km. Then Raman amplification is generated in the range from the point of about 50 km to the emission end of optical transmission line (point of the transmission distance=100 km). Therefore, in the case of the backward pumping, it can be understood that there is possibility for generation of the non-linear optical effects in the range where the Raman amplification can be observed. Particularly, it can also be assumed that the non-linear optical effects may be generated even at the emission end when the excited optical power exceeds +26 dBm.

As explained above, various non-linear optical effects can be assumed but such effects depend on the kind of optical fiber, wavelength and wavelength spacing from the viewpoint of the degree of effects to deteriorate the waveform. For example, in the high-density wavelength multiplexing system utilizing SMF, since XPM is distinctive, it is enough when consideration is taken mainly to the waveform deterioration by XPM. Moreover, in the NZ-DSF, since FWM is distinctive, it is enough when consideration is taken mainly to waveform deterioration by FWM. Of course, it is naturally possible to take consideration into a plurality of non-linear optical effects.

Therefore, in FIG. 3, since the optical transmission line 12 is NZ-DSF, simulation has been performed for FWM. In the case where the optical transmission line 12 is SMF, simulation can be made in the same manner as explained below for XPM. It is enough that simulation is conducted according to this non-linear optical effect considering the non-linear optical effects mainly generated depending on the kind of optical fiber used as the optical transmission line 12, number of wavelengths and wavelength spacing.

Figure 4:
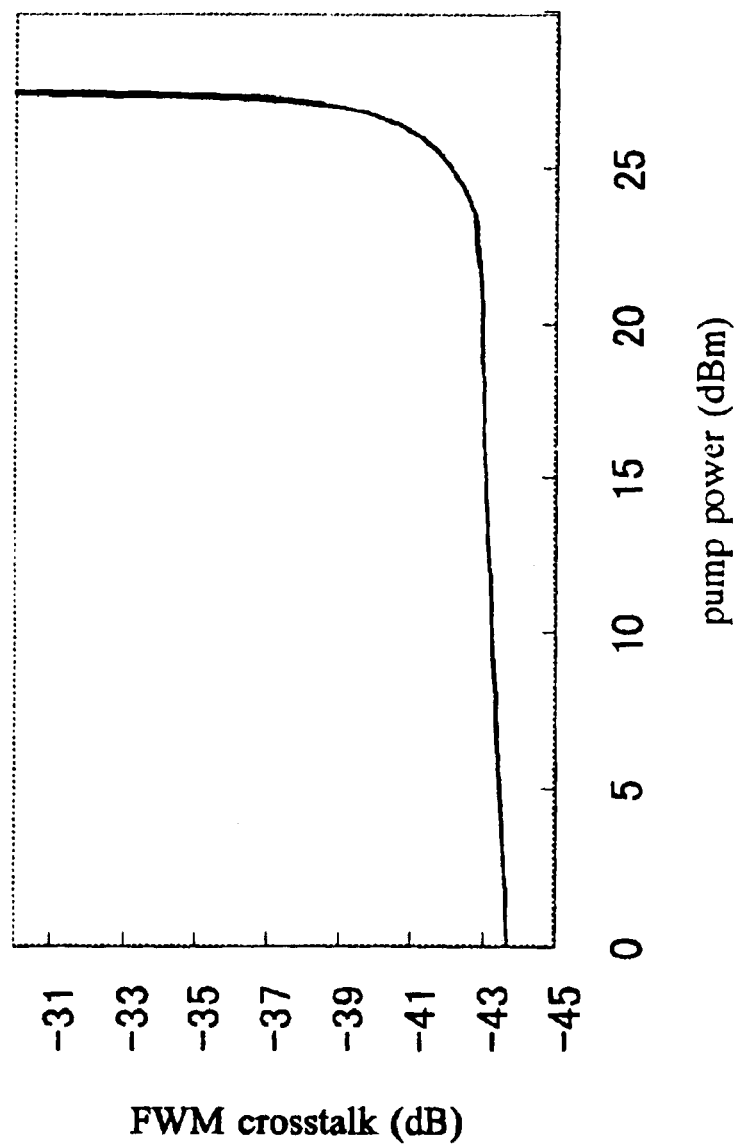
FIG. 4 is a diagram illustrating relationship between the excited optical power and crosstalk of FWM.

FIG. 4 is a diagram illustrating the relationship between the excited optical power and crosstalk of FWM. In FIG. 4, the lateral axis designates the excited optical power in unit of dBm, while the vertical axis designates crosstalk of FWM in unit of dBm. Since FIG. 3 indicates the result of Raman amplification, FIG. 4 also indicates crosstalk of FWM by the Raman amplification.

This FIG. 4 can be calculated with the Expression 2 to calculate FWM. In this calculation process, the optical transmission line is divided to M transmitting sections and one transmitting section is further assumed as the optical fiber in the specified length L are connected in the number N in total.

$$P_{FWM} = \frac{1024\pi^6}{n_o^4 \lambda^2 c^2}(D_\chi)^2 \frac{PpPqPr}{Aeff^2} e^{-\alpha L} \times$$

$$\left| \sum_{m=1}^{M} \times \exp\left(i \sum_{k=1}^{m-1} \Delta\phi^{(k)}\right) \times \right.$$

$$\sum_{n=1}^{N} \exp\left(\sum_{j=1}^{n-1}(-\alpha + i\Delta\beta^{(mj)})L_o\right) \times$$

$$\left. \frac{1 - \exp((-\alpha + i\Delta\beta^{(mn)})L_o)}{\alpha - i\Delta\beta^{(mn)}} \right|^2$$

[Expression 2]

Here, $L_0$, length of the optical fiber (L0=L×N); $\alpha$, loss coefficient of the optical fiber; $\beta p^{(mn)}$, propagation constant in frequency fp in the optical fiber n of the transmitting sections m; $\beta q^{(mn)}$ propagation constant in frequency fq in the optical fiber n of the transmitting section m; $\beta r^{(mn)}$, propagation constant in frequency fr in the optical fiber n of the transmitting sections m; $\beta f^{(mn)}$ is propagation constant of FWM in the optical fiber n of the transmitting section m; $n_o$, refractive index; $\lambda$, wavelength; c, light velocity; D, number of degeneracies; $\chi$, cubic non-linear polarization; Aeff, effective area; Pp, Pq and Pr, input optical powers of frequencies fp, fq and f4; $\Delta\beta^{(mn)}$ is expressed with $$\Delta\beta^{(mn)} = \beta p^{(mn)} + \beta q^{(mn)} - \beta r^{(mn)} - \beta_F^{(mn)}$$

$$= -\frac{\pi^4 dDc}{c^2 d}\{(fp - f_o^{(mn)}) + (fq - f_o^{(mn)})\} \times$$

$$(fp - fr)(fq - fr);$$

and $\Delta\phi^{(m)}$ is expressed with $$\Delta\phi^{(m)} = \sum_{n=1}^{N} \beta p^{(mn)} L_o + \sum_{n=1}^{N} \beta q^{(mn)} L_o - \sum_{n=1}^{N} \beta r^{(mn)} L_o - \sum_{n=1}^{N} \beta_F^{(mn)} L_o.$$

As illustrated in FIG. 4, it can be understood that WFM becomes distinctive when the excited optical power reaches about +25 dBm and is rapidly generated when the power becomes about +27 dBm.

Accordingly, waveform deterioration can be controlled in the range where the Raman amplification is observed by controlling the incident optical power of the WDM optical signal in view of not generating waveform deterioration exceeding the predetermined range due to the non-linear optical effects.

Such control can be realized by generating the characteristic diagram as illustrated in FIG. 3 conforming to the Expression 1 and obtaining the average optical power of signal at the emission end in the case of backward pumping. The incident optical power of the WDM optical signal is determined to limit the average optical power of signal to the limit value or less of waveform deterioration in the optical transmission line 12. For example, in FIG. 3, when the excited optical power is +25 dBm or less, the incident optical power is set to +3 dBm/ch., while the excited optical power is +25 dBm or higher but is +26 dBm or less, the incident optical power is set to +2 dBm/ch. to limit the optical power at the emission end becomes limit value or less for waveform deterioration. The incident optical power is also set in the same manner as the case where the excited optical power exceeds +26 dBm.

As explained above, it is enough when the relation table of the incident optical power corresponding to a plurality of excited optical powers is previously generated depending on the Expression 1, it is then stored, for example, in the memory of control part 24, the control part 24 refers to this relationship table depending on an output of the pump light detecting part 22-1 and the adjusting part 23 controls the optical power of the light incident to the optical transmission line 12.

Otherwise, this relationship table may be generated through actual measurement. Moreover, it can be calculated with the other Expression for calculating the Raman amplification, for example, the other approximated Expression.

Further, such control can also be realized by generating the characteristic diagram of FIG. 4 conforming to the Expression 2, obtaining the excited optical power that generates waveform deterioration exceeding the predetermined range with the non-linear optical effects and thereby previously generating the relationship table between the excited optical power and incident optical power.

Here, the range where the Raman amplification can be observed is different depending on the kind of optical transmission line as the optical amplifying medium and is determined, as can be understood from the Expression 1, for example, depending on transmission loss of optical transmission line, splice loss and effective cross-sectional area.

Moreover, the predetermined waveform deterioration can be determined with the performance required for this distributed optical amplifier, for example, with an error rate.

As explained above, in the first embodiment, waveform deterioration can be controlled with such control process. Therefore, in this case, simulation has been conducted for the improvement effect of optical SNR.

Figure 5:
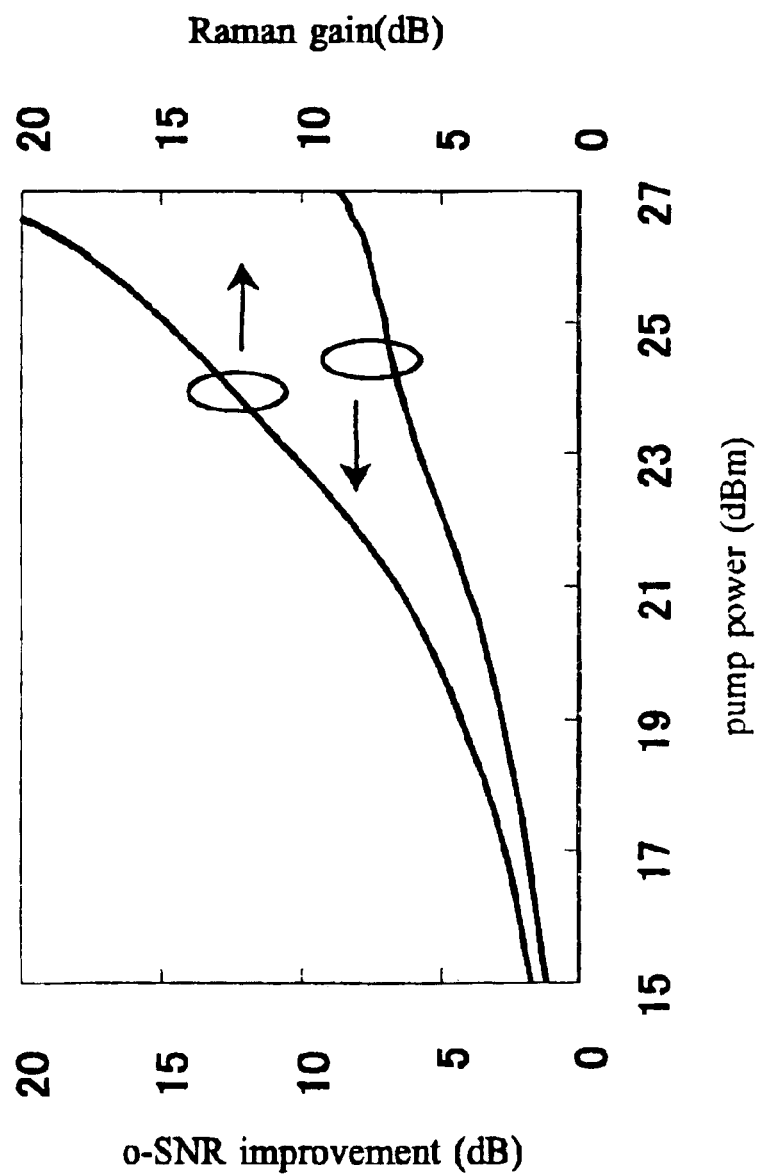
FIG. 5 is a diagram illustrating relationship between the excited optical power and Raman gain and relationship between the excited optical power and optical SNR improvement.

FIG. 5 is a diagram illustrating the relationships between the excited optical power and Raman gain and between the excited optical power and optical SNR improvement.

Figure 15:
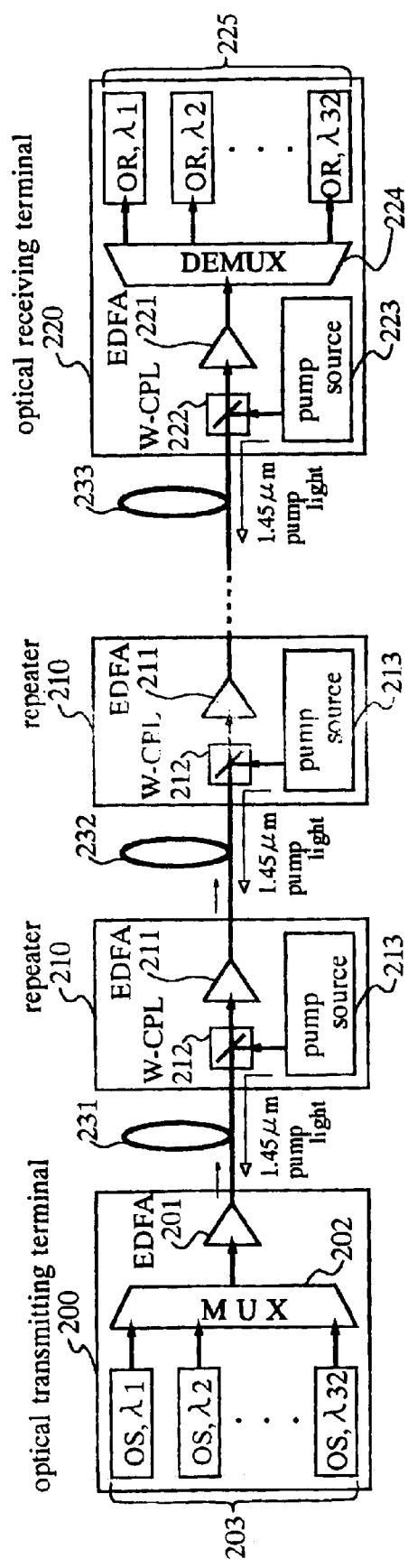
FIG. 15 is a diagram illustrating a structure of an optical amplifying and relaying transmission system utilizing the Raman distributed amplifier.

FIG. 5 illustrates the result of calculation for optical SNR improvement of EDFA 211 by pumping the optical transmission line 231 with the pump light source 213 in the repeater 210 in the system configuration of FIG. 15.

Here, the optical transmitter output power is fixed to +4 dBm/ch. in the wavelength spacing of 100 GHz in the range of 1536 nm to 1561 nm for 32-channel multiplexing and EDFA 211 is set to 7 dB.

In FIG. 5, the lateral axis designates the excited optical power in unit of dBm, while the right vertical axis, the Raman gain in unit of dBm and the left vertical axis, the optical SNR improvement in unit of dBm. The reference optical SNR improvement is the optical SNR when the excited optical power is $-\infty$dBm (non-excited condition).

The upper solid line indicates the relationship between the excited optical power and Raman gain. As illustrated in FIG.

5, in this relationship, the Raman gain increases with increase of excited optical power corresponding to FIG. 3.

On the other hand, a lower solid line indicates the relationship between the excited optical power and optical SNR improvement and the optical SNR improvement is gradually improved as illustrated in FIG. 5 with increase of the excited optical power.

It can be understood that when the pump light is set to +26 dBm, the Raman gain of +17 dBm can be obtained but the actual optical SNR improvement becomes 6.5 dB due to the noise beam generated in the Raman amplification process Moreover, from this figure, it can also be known that optical SNR of EDFA can be improved when the pumping level is raised.

Figure 6:
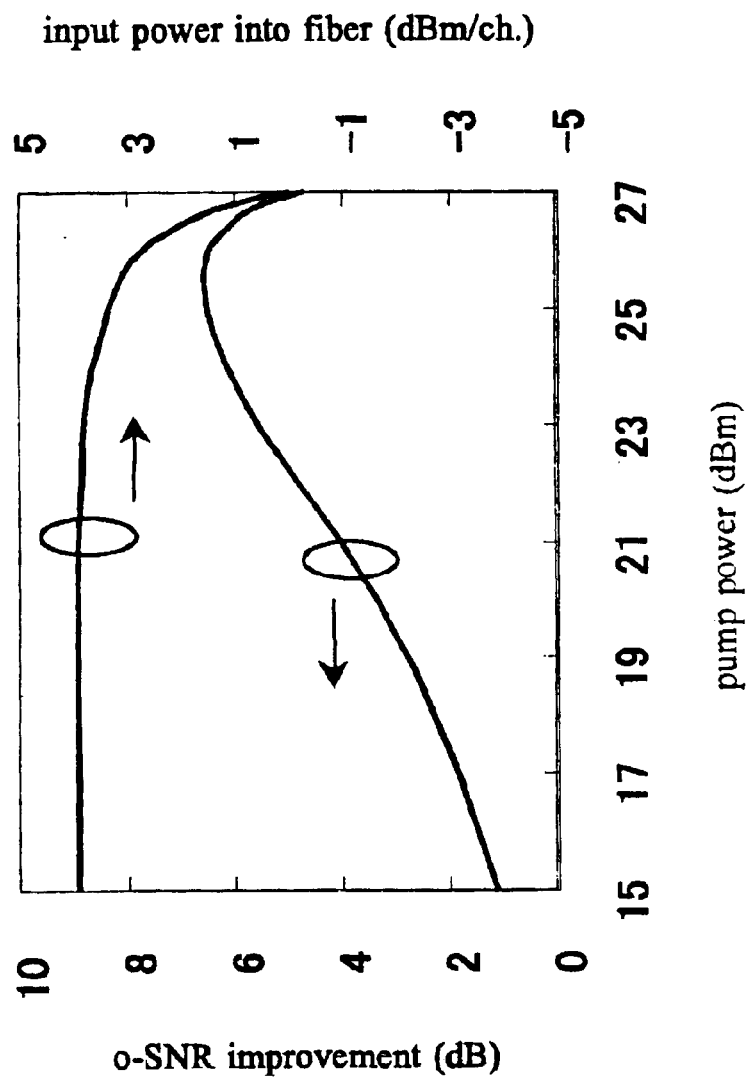
FIG. 6 is a diagram illustrating the relationship between the excited optical power and incident optical power and relationship between the excited optical power and optical SNR improvement.

FIG. 6 illustrates the relationship between the excited optical power and incident optical, power and between the excited optical power and optical SNR improvement. Result of FIG. 6 has been calculated with the system of FIG. 15 as in the case of FIG. 5.

In FIG. 6, the lateral axis designates the excited optical power in unit of dBm, while the right vertical axis, the incident optical power in unit of dBm/cm and the left vertical axis, the optical SNR improvement in unit of dB.

Since the optical power increases in the side of output end of optical transmission line in such a case that the Raman amplification is performed depending on the characteristic of FIG. 4, there is a fear for deterioration of the transmission characteristic due to FWM. Therefore, when the pumping energy of Raman amplification is raised, optical level to be input to the optical transmission line is lowered in order to stop generation of FWM crosstalk. This characteristic can be calculated with the Expression 2.

As indicated with a upper solid line in FIG. 6, in regard to above relationship, when the excited optical power is about +23 dBm or less, the incident optical power is almost constant (the range less than +15 dBm or less is not illustrated), when it is in the range of about +23 dBm to about +25 dBm, the incident optical power must be reduced gradually and when it is in the range of about +25 dBm to about +27 dBm, the incident optical power must be reduced quickly.

When the optical signal input power per channel of the optical transmitter is controlled considering FWM, the result of optical SNR improvement of EDFA 210 is indicated with a chain line.

The lower solid line indicates the relationship between the excited optical power and optical SNR improvement when it is about +25 dBm or less, the optical SNR improvement increases gradually with increase of the excited optical power and when it is in the range of about +25 dBm to about +27 dBm, the optical SNR improvement reduces with increase of the excited optical bam power.

When only the optical SNR improvement rate of EDFA 211 of the optical repeater 210 is considered by adjusting the input power of optical signal to be input to the optical transmission line like the characteristic of upper solid line of FIG. 6 in order to stop generation of FWM in the output end side of optical transmission line, the optical SNR is no longer improved, unlike FIG. 5, even when the excited optical power is increased and thereby it is understood that the optical point exists.

As explained above, the characteristic curve indicating the relationship between the excited optical power indicated with a upper solid line in FIG. 6 and the incident optical power is previously generated and it is then stored, for example, in the memory in the control part 24. Therefore, the control part 24 refers to this characteristic curve depending on an output of the pump light detecting part 22-1 and controls the optical power of the light incident to the optical transmission line 12.

Otherwise, it is also possible to generate the table indicating the relationship between the excited optical power and the incident optical power through the approximation with the polygonal line by dividing the characteristic curve for each predetermined excited optical power. The range of this division may be determined with the constant interval, or with the wider interval in the range where change of the incident optical power is small for change of the excited optical power or with the narrower interval in the range where change of the incident optical power is large for change of the excited optical power. For instance, in FIG. 6, each range of the excited optical power is +15 dBm or more and under +23 dBm, +23 dBm or more but under +23 dBm, +25 dBm or more but under +26 dBm, +26 dBm or more but under +26.5 dBm, and +26.5 dBm or more but +27 dBm or less.

As explained above, since the distributed optical amplifier can improve the optical SNR, when the light to be amplified is the optical signal, as illustrated with a lower solid line of FIG. 6 by adjusting the incident optical power depending on the excited optical power. For instance, when the excited optical power is +23 dBm, the incident optical power is adjusted to +3.8 dBm. As a result, the optical SNR can be improved as much as about 5.3 dB.

Although not illustrated, moreover, in the optical communication system of FIG. 1 and FIG. 2, a path average power of optical signal in the optical transmission line 12 is reduced in comparison with that when the Raman amplification is not executed. Therefore, the waveform deterioration by SPM and XPM and the other non-linear optical effects generated in the optical signal in the optical transmission line 12 is also reduced.

(A More Preferable Structure of the First Embodiment)

It is preferable for the control part 24 to control the incident optical power depending on an output of the pump light detecting part so that exit optical power at the incident end of the pump light becomes less than the optical power to generate the predetermined waveform deterioration with the non-linear optical effects conforming to the optical amplifying medium when the light is incident under the condition that the pump light is supplied to the optical transmission line 12 as the optical amplifying medium.

In the Raman amplification, since the optical power of the light in the optical amplifying medium becomes maximum at the incident end to which the pump light is supplied, the waveform deterioration in the optical amplifying medium can be controlled to the value less than the predetermined range by adjusting the incident optical power to provide the waveform deterioration less than the predetermined range at the incident end explained above.

Particularly, the distributed optical amplifier is further provided with a residual pump light detecting part 26 for detecting the optical power of the residual pump light after propagation of the pump light through the optical transmission line 12 as the optical amplifying medium and it is also preferable that the correspondence relationship between the excited optical power and incident optical power is obtained according to an output of the residual pump light detecting part 26.

In FIG. 2, the residual pump light detecting part 26 and coupler 34 are indicated with a broken line. The pump light supplied from the optical supplying part 21-1 is incident to the residual pump light detecting part 26 via the coupler 31-1, WDM coupler 32-1, optical transmission line 12 and coupler 34.

A loss for the excited wavelength of the optical transmission line 12 as the optical amplifying medium can be measured actually by measuring the residual pump light. Therefore, since FIG. 3 and FIG. 6 explained above can be generated more precisely, this distributed optical amplifier can surely control waveform deterioration and improve optical SNR.

Particularly, in the distributed optical amplifier, the optical supplying part 21 is preferably composed of a plurality of optical supplying parts 21 for supplying the light at different places of the optical transmission line 12 as the optical amplifying medium, while the pump light detecting part 22 is preferably composed of a plurality of detecting parts 22 corresponding to the number of the optical supplying parts 21.

The distributed optical amplifier assures large gain at the area near the place where the pump light is supplied. For instance, in the case of backward pumping as illustrated in FIG. 3, the Raman amplification is performed distinctively at the emission end (transmission distance=100 km) but is almost not performed at the incident end (transmission distance=0 km).

The light can be amplified in average by supplying the pump light from a plurality of places on the optical transmission line 12 as explained above. In this case where the pump light is supplied from a plurality of areas, the relationship between the excited optical power and incident optical power can be obtained by generating the diagram corresponding to FIG. 3 to FIG. 6. The distributed optical amplifier of the present invention can control the control part 24 according to this relationship.

In the case where forward pumping and bi-directional pumping are performed in FIG. 2, the light supplying part 21-2 and pump light detecting part 22-2 provided in the terminal A 11 are indicated with a broken line. The pump light emitted from the light supplying part 21-2 is supplied to the optical transmission line 12 via the coupler 31-2 and WDM coupler 32-2 and a part of the pump light is incident to the pump light detecting part 22-2 with the coupler 21-2.

Moreover, particularly, the distributed optical amplifier is further provided with an amplified light detecting part 28 for detecting the optical power after the light is amplified with the optical amplifying medium and the correspondence relationship between the excited optical power and incident optical power is preferably obtained according to the distributed amplification gain obtained with the amplified light detecting part 28.

In FIG. 2, the amplified light detecting part 28 and coupler 35 are indicated with a broken line. The light emitted from the WDM coupler 32-1 is then incident to the amplified light detecting part 28 via the coupler 35.

Since FIG. 3 and FIG. 6 can be generated more precisely by measuring the distributed amplification gains, this distributed optical amplifier can control more accurately the waveform deterioration and improve the optical SNR.

In the first embodiment, the WDM optical signal has the wavelength band of 1550 nm, 32 waves and wavelength spacing of 0.8 nm, but this optical signal can also have the other conditions. Namely, the WDM optical signal of desired wavelength band, number of waves, and wavelength spacing can be adapted to the optical communication system and distributed optical amplifier of the present invention. Therefore, in the other preferred embodiments explained below, these conditions are not particularly explained.

The first preferred embodiment refers to transmission distance of 100 km and NZ-DSF but similar explanation can be applied to the other conditions. The optical amplifying medium having the desired transmission distance and desired characteristics can be adapted to the optical communication system and distributed optical amplifier of the present invention. The optical amplifying medium is, for example, DSF, DFF and SMF or the like. Therefore, the conditions of these will not be explained in the embodiments explained below.

Next, another preferred embodiment will be explained.
(Structure of Second Embodiment)

Like the first embodiment, the optical communication system of the second embodiment is the optical communication system for transmitting and receiving the WDM optical signal between a couple of terminals and the distributed optical amplifier is used in this optical communication system to amplify the WDM optical signal utilizing the optical transmission line as the optical amplifying medium with the backward pumping. Structures of the terminal A 51 and terminal B 53 in the optical communication system and distributed optical amplifier will be explained below.

Figure 7:
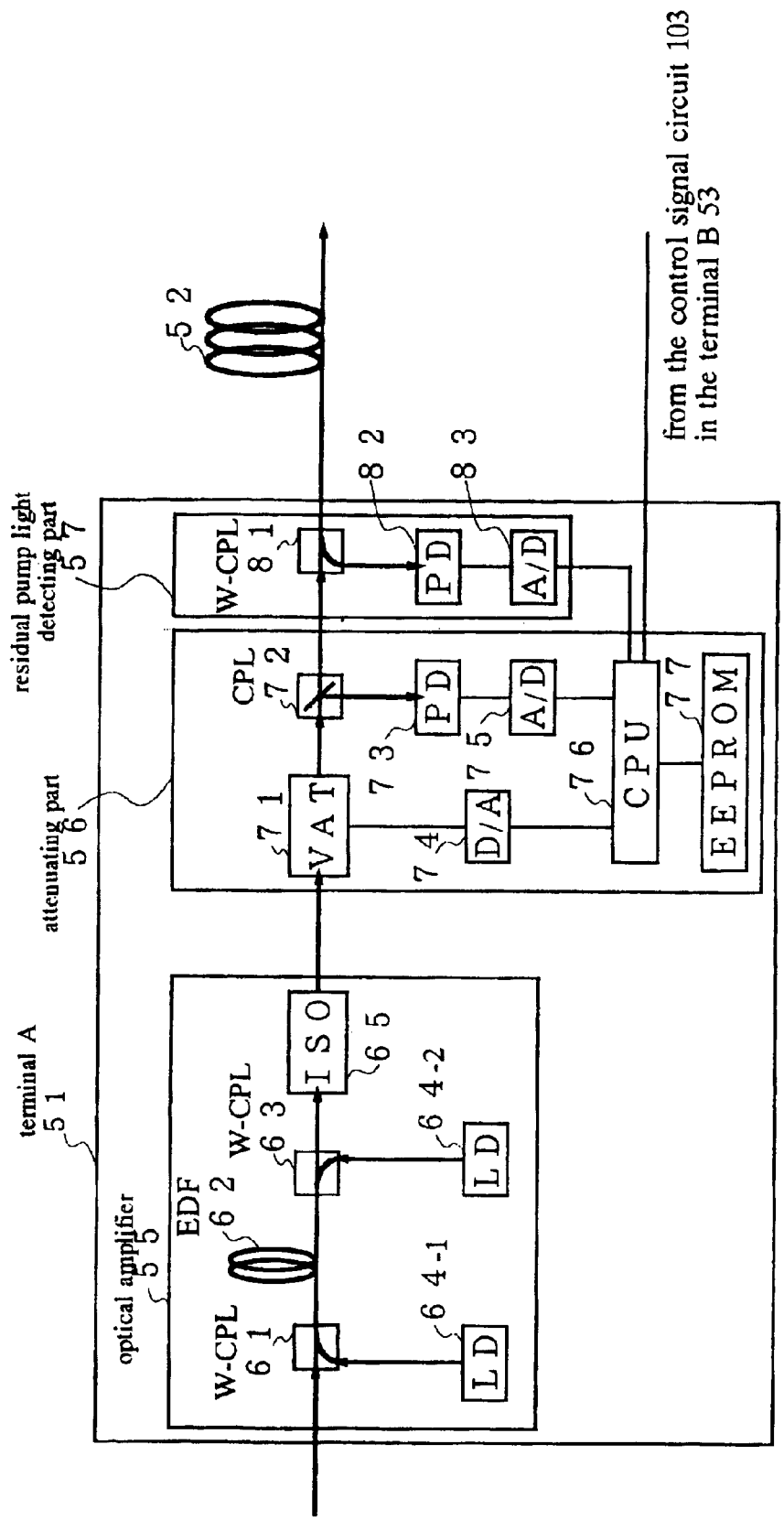
FIG. 7 is a diagram illustrating a structure of terminal A in the optical communication system of the second embodiment.

FIG. 7 illustrates a structure of the terminal A in the optical communication system of the second embodiment.

Figure 8:
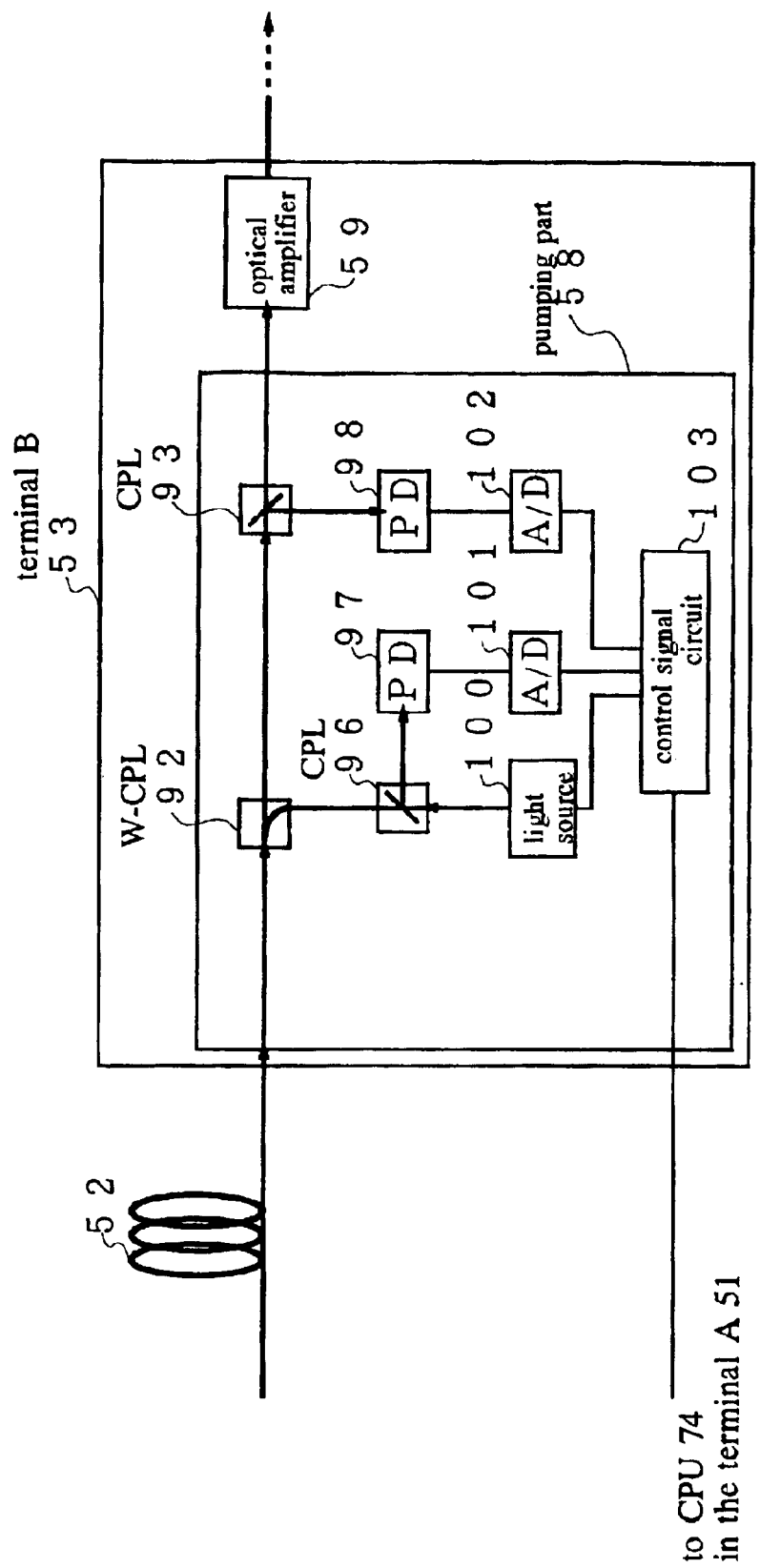
FIG. 8 is a diagram illustrating a structure of terminal B in the optical communication system of the second embodiment.

FIG. 8 illustrates a structure of the terminal B in the optical communication system of the second Embodiment.

In FIG. 7 and FIG. 8, the WDM optical signal transmitted from the other terminal is then incident to the terminal A 51. The terminal A 51 processes, as will be explained later, this WDM optical signal and then transmits this signal to the optical transmission line 52. The WDM optical signal transmitted through the optical transmission line 52 is then transmitted to the terminal B51.

The terminal A 51 is formed with inclusion of the centralized optical amplifier 55 for amplifying an light, an attenuation part 56 for adjusting the optical power of light through attenuation and a residual light detecting part 57 for detecting optical power of the residual pump light. The residual pump light means the light attained after the pump light supplied to the optical transmission line 52 from the terminal B 53 has been propagated through the optical transmission line 52.

The WDM signal incident to the terminal A 51 is then incident to the WDM coupler 61 in the optical amplifier 55 and is then emitted as an output of the optical amplifier 55 via the erbium added optical fiber (hereinafter, abbreviated as "EDF") 62, WDM coupler 63 and optical isolator (hereinafter, abbreviated as "ISO") 65.

Meanwhile, the semiconductor laser (hereinafter, abbreviated as "LD") 64-1 emits the pump light for pumping EDF 62 and the pump light is incident to EDF 62 via the WDM coupler 61. LD 64-2 emits the pump light for pumping EDF 62 and the pump light is incident to EDF 62 via the WDM coupler 63. The pump light of these LDs 64 has the wavelength to excite EDF 62, for example, 980 nm or 1480 nm. In these LDs 64, the optical power of the pump light is set so that the optical amplifier 55 can amplify the light in the predetermined gain. It is also possible to set the optical power of the pump light so that the optical amplifier 55 provides the predetermined output light.

As LD 64, various semiconductor lasers, for example, Fabry-Perot type laser, distributed feedback type laser, distributed Bragg-reflector type laser may be used. Moreover, a laser array for optically multiplexing the laser beams emitted from a plurality of semiconductor lasers with the WDM coupler can also be used.

EDF 62 forms the inverted distribution because the electrons in EDF 62 are excited because of absorption of the pump light from LD 64. When the WDM optical signal is incident under the condition that this inverted distribution is formed, inductive radiation occurs depending on this WDM optical signal and thereby the WDM optical signal is amplified.

The WDM couplers 61, 63 are optical multiplexing/demultiplexing filters. The optical multiplexing/demultiplexing filter emits, in the case of multiplexing, the light by wavelength-multiplexing a plurality of incident lights in different frequencies and emits, in the case of optical branching, a plurality of lights in different frequencies through branching of the incident light at the boundary of the predetermined wavelength.

ISO 65 is an optical part for transmitting the light only in one direction and the other ISOs explained later operate in the same manner. The ISO 65 can be formed, for example, by providing a Farady rotator between a couple of polarizers that are deviated by 45 degrees. ISO 65 has a role of preventing continuous propagation of the light reflected from the connecting sections of respective optical parts in the device. Particularly, when the reflected light returns to the semiconductor laser, the semiconductor laser is induced with the reflected light having various phases and amplitudes to change its oscillation mode and generate noise. Therefore, ISO 65 prevents such adverse effects.

The WDM optical signal emitted from the optical amplifier 55 is then incident to a variable optical attenuator (hereinafter, abbreviated as "VAT") 71 within the attenuating part 56.

VAT 71 is an optical part that emits the attenuated incident light and also changes its attenuation level. The other VATs explained later also operate as explained above. Attenuation level of VAT 71 is adjusted with CPU 76 via a digital/analog converter (hereinafter, abbreviated as "D/A") to convert a digital signal to an analog signal. As VAT, for example, an optical variable attenuator wherein an attenuating disk is inserted between the incident light and exit light, the surface of the attenuation disk is coated with a metal film which is continuously changed in the thickness in the rotating direction with the vacuum evaporation method and attenuation level is changed by rotating this attenuation disk and an optical variable attenuator wherein a magneto-optical crystal is inserted between the incident light and exit light, a polarizor is inserted in the emitting side of this magneto-optical crystal, a magnetic field is impressed to the magneto-optical crystal and attenuation level is adjusted by changing intensity of magnetic field may be used.

The WDM optical signal emitted from VAT 71 is incident to a coupler 72 for branching the light into a couple of lights. One WDM optical signal of the branched lights is incident to the residual light detecting part 57 as the output of attenuator 56. The other WDM optical signal of the branched lights is incident to a photodiode (hereinafter, abbreviated as "PD") 73 that outputs a current depending on the optical power of the received light.

An output of PD 73 is input to CPU 75 via an analog/digital converter (hereinafter, abbreviated as "A/D") 75 to convert an analog signal to a digital signal.

CPU 76 determines the optical power of the WDM optical signal according to an output of this PD 73.

Moreover, EEPROM 77 as the electrically erasable and programmable non-volatile memory stores the table indicating relationship between the excited optical power and incident optical power and programs required for control of the distributed optical amplifier.

The WDM optical signal emitted from the attenuator 56 is emitted as an output of the residual light detecting part 57 via the WDM coupler 81 in the residual light detecting part 57. The WDM optical signal emitted from the residual light detecting part 57 is emitted to the optical transmission line 52 as an output of the terminal A 51 and is then transmitted to the terminal B 53.

The WDM coupler 81 branches the residual pump light of the pump light for distributed amplification supplied to the optical transmission line 52 in the terminal B 53. Therefore, cut-off wavelength (cut-off frequency) of the WDM coupler 81 is set between the wavelength band of the WDM optical signal and wavelength of the pump light.

The branched residual pump light is received with PD 82 and photo-electrically converted. An output of PD 82 is input to CPU 83 via A/D 83.

Meanwhile, the terminal B is formed with inclusion of an pumping part 58 for supplying the pump light for distributed amplification and an optical amplifier 59 for amplifying the light. Here, since the optical amplifier 59 is the centralized optical amplifier and has the structure similar to that of the optical amplifier 55, the same explanation is not repeated here. The WDM optical signal propagated through the optical transmission line 52 from the terminal A 51 is incident to the optical amplifier 59 via the pumping part 58, then optically amplified to the predetermined level and thereafter transmitted to the optical transmission line for the transmission to the other terminals.

In the pumping part 58, the incident WDM optical signal is then incident to the coupler 93 via the WDM coupler 92. One WDM optical signal branched with the coupler 93 is emitted as an output of the pumping part 58, while the other WDM optical signal is received with PD 98 and opto-electrically converted. An output of PD 98 is input to a control signal circuit 108 via A/D 102. An output of PD 98 corresponds to an optical power of the WDM optical signal.

Moreover, a light source 100 generates a pump light for distributed amplification depending on an output of CPU 76 input via the control signal circuit 103. Wavelength of pump light is set corresponding to the wavelength of light for distributed amplification and physical phenomenon for distributed amplification. In the second embodiment, the wavelength of pump light is set corresponding to the wavelength range of the WDM optical signal. For example, it is set tot 1.45 $\mu$m band for the Raman amplification of the 1.55 $\mu$m band. As the light source 100, a semiconductor laser or the like may be used and an optical amplifier for amplifying the pump light is also provided as required.

The pump light emitted from the light source 100 is incident to the WDM coupler 92 via the coupler 96. The coupler 96 branches a part of the pump light and the branched light is then incident to PD 97. PD 97 opto-electrically converts the received pump light and its output is then incident to the control signal circuit 103 via A/D 101.

The control signal circuit 103 converts the signal to that suitable for transmission of the optical power of the pump light judged according to an output of PD 97 and optical power of the WDM optical signal judged according to an output of PD 98 and then transmits this signal to CPU 76 in the terminal A 51.

As the optical fiber for transmitting this signal, an exclusive physical line may be prepared in addition to the optical transmission line 52. Otherwise, as this optical fiber, it is also possible to assign the one channel of the WDM optical signal. Moreover, this signal may be transmitted using the non-defined region within the overhead in SDH (synchronous digital hierarchy).

(Operation and Effect of the Second Embodiment)

In the second embodiment, following settings are performed for installing the distributed optical amplifier in the optical communication system.

An installer gives the excited optical power to CPU 76 in the terminal A 51 to drive the program stored in EEPROM 77.

The excited optical power is determined considering transmission characteristics and transmission distance of the optical transmission line 52.

First, CPU 76 adjusts attenuation level of VAT 71 to almost zero and pump light of light source 100 to almost zero to transmit the WDM optical signal from the other terminal to the terminal B 53 from the terminal A 51 via the optical amplifier 55, attenuator 56, residual light detecting part 57 and optical transmission line 52.

In this case, CPU 76 obtains an output of PD 98 in the terminal B 53 with the control signal circuit 103. An output of PD 98, in this case, is set to the optical power (hereinafter, referred to as "Pnon") of the WDM optical signal when distributed amplification by the light source 100 is not performed. This output becomes the reference level for calculation of the distributed amplification gain and is the actually measured loss of the optical transmission line 52 for the signal wavelength.

CPU 76 drives the light source 100 via the control signal circuit 103 and supplies the pump light to the optical transmission line 52. CPU 76 obtains outputs of PD 97 and PD 98 via the control signal circuit 103. In this case, an output of PD 98 is an optical power of the WDM optical signal when distributed amplification by the light source 100 is performed (hereinafter, referred to as "Pram"). CPU 76 subtracts previous Pnon from this Pram to obtain the difference. This difference is the distributed amplification gain (hereinafter, referred to as "Gdis").

CPU 76 obtains an output of PD 82 of the terminal A 51. This output corresponds to the residual excited optical power (hereinafter, referred to as "Prem").

CPU 76 generates a table indicating relationship between the excited optical power and incident optical power using the Expression explained in regard to the first embodiment from the actually measured loss, distributed amplification gain Gdis and residual excited optical power Prem of the optical transmission line 52 for these signal wavelengths. CPU 76 then stores this relationship table in EEPROM 77.

CPU 76 refers to this relationship table and adjusts attenuation level of VAT 71 to obtain the incident optical power corresponding to the preset excited optical power. CPU 76 judges whether the corresponding incident optical power is obtained or not depending on the output of PD 73 and performs the feedback control for the attenuation level of VAT 71.

If the excited optical power changes after the setting, the installer gives a new excited optical power to CPU 76. CPU 76 drives the light source 100 with such new setting through the control signal circuit 103 to change the excited optical power. CPU 76 refers to the relationship table stored in EEPROM 77 on the basis of an output of PD 97 and searches the incident optical power corresponding to this new setting. CPU 76 adjusts the attenuation level of VAT 71 to obtain the searched incident optical power.

The distributed optical amplifier of the second embodiment operates as explained above and therefore the incident optical power is adjusted depending on the excited optical power and thereby the non-linear optical effects can be controlled. Therefore, the optical communication system of the second embodiment can control waveform deterioration. Moreover, the optical communication system can improve the optical SNR through the distributed amplification and thereby the optical communication system of the second embodiment assures ultra long-distance optical transmission.

The other embodiments will further be explained hereunder.

(Structure of the Third Embodiment)

Figure 9:
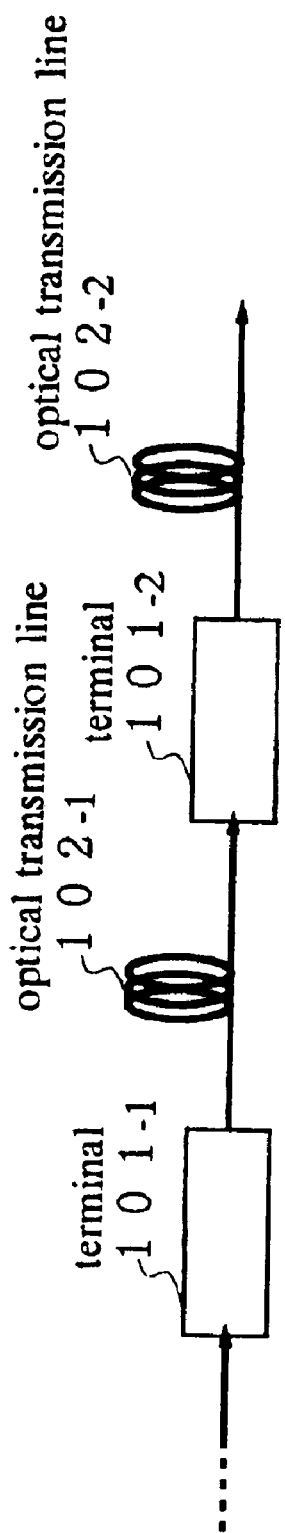
FIG. 9 is a diagram illustrating a structure of the optical communication system of the third embodiment.

FIG. 9 is a diagram illustrating a structure of the optical communication system of the third embodiment.

Figure 10:
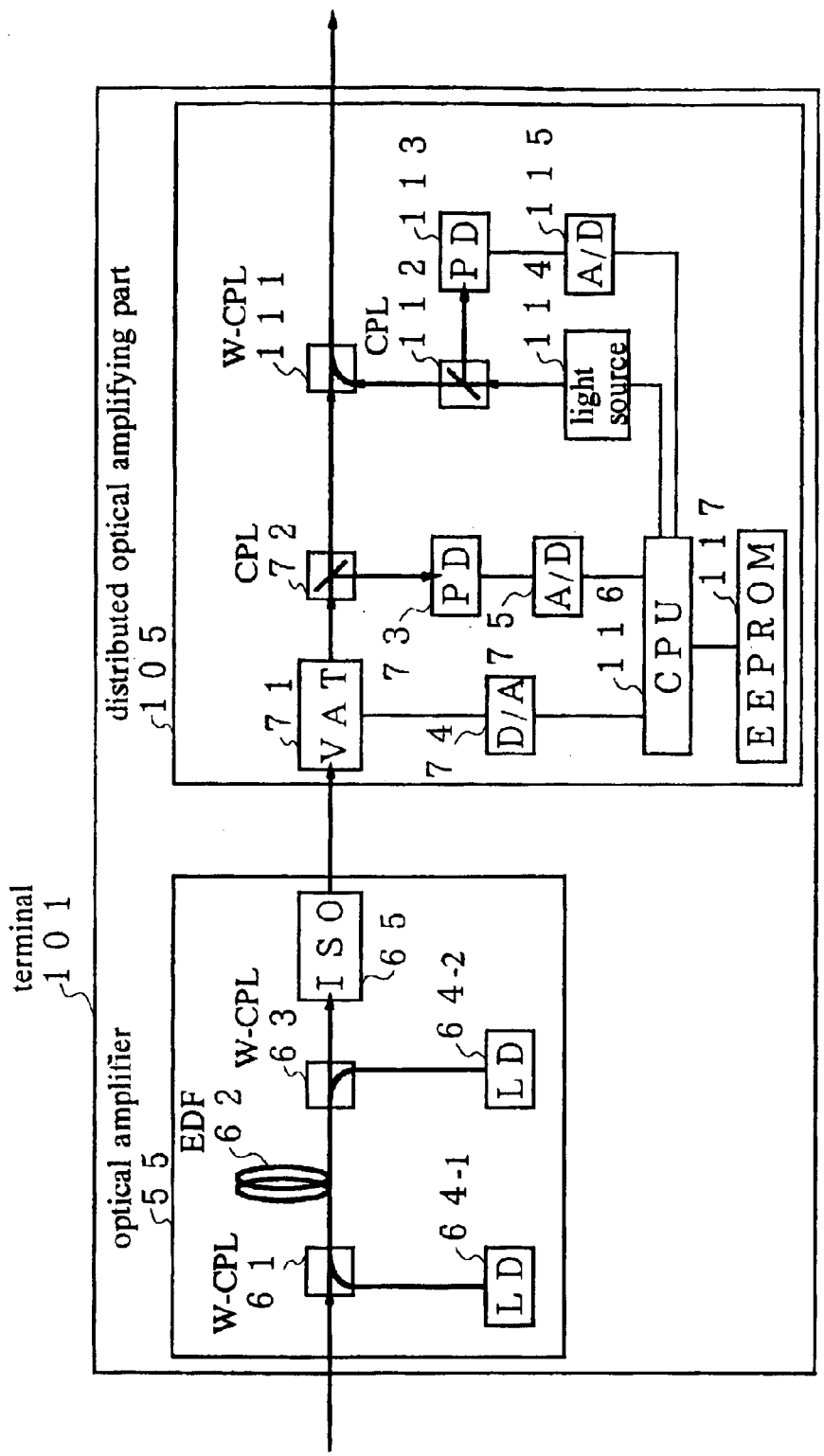
FIG. 10 is a diagram illustrating a structure of the distributed optical amplifier of the third embodiment.

FIG. 10 is a diagram illustrating a structure of the distributed optical amplifier of the third embodiment.

In FIG. 9, the optical communication system of the third embodiment is the optical communication system for transmitting and receiving the WDM optical signal between a couple of terminals, wherein the terminal 101-1 transmits the WDM signal in which a plurality of optical signals are wavelength-multiplexed to the terminal 101-2 via the optical transmission line 102-1.

The distributed optical amplifier is provided within the optical communication system for distributed amplification of the WDM optical signal using the optical transmission line 102 as the optical amplifying medium with the forward pumping. In FIG. 9 and FIG. 10, the terminal 101 is formed with inclusion of the centralized optical amplifier 55 for amplifying the light and the distributed optical amplifying part 105 for distributed amplification.

The WDM optical signal incident to the terminal 101 is then incident to the WDM coupler 61 within the optical amplifier 55 and is then emitted as an output of the optical amplifier 55 via the WDM coupler 63 and ISO 65. On the other hand, LD 64-1 supplies the pump light to EDF 62 via the WDM coupler 61, while LD 64-2 supplies the pump light to EDF 62 via the WDM coupler 63.

The WDM optical signal emitted from the optical amplifier 55 is then incident to VAT 71 in the distributed optical amplifying part 105. Attenuation level of VAT 71 is adjusted with CPU 116 via D/A 74. The WDM optical signal adjusted in the optical power with VAT 71 is then incident to the WDM coupler 111 via the coupler 72.

The coupler 72 branches a part of the incident WDM optical signal. The branched WDM optical signal is received by PD 73 and is then opto-electrically converted therein and an output of PD 73 is then input to CPU 116 via A/D 75. CPU 116 judges the optical power of the WDM optical signal according to an output of this PD 73.

Moreover, EEPROM 117 as the electrically erasable and programmable non-volatile memory stores the table indicating relationship between the excited optical power explained in the first embodiment and the incident light and the program required for control of the distributed optical amplifier. This relationship table is previously generated with the method similar to that in the first embodiment.

The light source 114 generates the pump light for distributed amplification depending on an output of CPU 116. The wavelength of pump light is set corresponding to the wavelength of light for distributed amplification and physical phenomenon for distributed amplification. As the light source 114, a semiconductor laser may be used and an optical amplifier for amplifying the pump light is provided as required.

The pump light emitted from the light source 114 is incident to the WDM coupler 111 via the coupler 112. The coupler 112 branches a part of the pump light and the branched pump light is then incident to PD 113. PD 113 opto-electrically converts the received pump light and its output is then input to CPU 116 via A/D 115.

The WDM coupler 111 wavelength-multiplexes the WDM optical signal and pump light for distributed amplification of the WDM optical signal and also emits, in order to transmit to the next terminal, the wavelength-multiplexed WDM optical signal and pump light to the optical transmission line 102.

(Operation and Effect of the Third Embodiment)

In the third embodiment, following settings are performed at the time of installation of the distributed optical amplifier in the optical communication system.

An installer gives the excited optical power to CPU 116 in the terminal 101 and drives the program stored in EEPROM 77.

Here, the excited optical power is determined considering the transmission characteristics and transmission distance of the optical transmission line 102.

CPU 116 drives the light source 114 to supply the pump light to the optical transmission line 102. CPU 116 obtains an output of PD 113 to actually measure the excited optical power.

CPU 116 refers to the relationship table stored in EEPROM 117 according to the actually measured excited optical power and adjusts attenuation level of VAT 71 to attain the incident optical power corresponding to the excited optical power. CPU 116 judges, according to an output of PD 73, whether the corresponding incident optical power is obtained or not and executes the feedback-control for attenuation level of VAT 71.

If the excited optical power changes after the setting, the installer gives a new excited optical power to CPU 116. CPU 116 drives the light source 114 with such new setting to change the excited optical power. CPU 116 refers to the relationship table stored in EEPROM 117 according to an output of PD 113 to search the incident optical power corresponding to such new setting. CPU 116 adjusts the attenuation level of VAT 71 to attain the searched incident optical power.

The distributed optical amplifier of the third embodiment operates as explained above and therefore adjusts the incident optical power depending on the excited optical power to control the non-linear optical effects. Therefore, the optical communication system in this third embodiment is capable of controlling the waveform deterioration and improving the optical SNR. Therefore, this optical communication system realizes ultra long-distance transmissions.

Another embodiment will be explained next.

(Structure of Fourth Embodiment)

The optical communication system of the fourth embodiment is the optical communication system, like the first embodiment, for transmitting and receiving the WDM optical signal between a couple of terminals. The distributed optical amplifier is provided in this optical communication system to amplify the WDM optical signal using the optical transmission line as the optical amplifying medium with the forward pumping. Structures of the terminal A 131 and terminal B 133 in this optical communication system and distributed optical amplifier will be explained later.

FIG. 112 is a diagram illustrating a structure of the terminal A in the optical communication system of the fourth embodiment.

Figure 12:
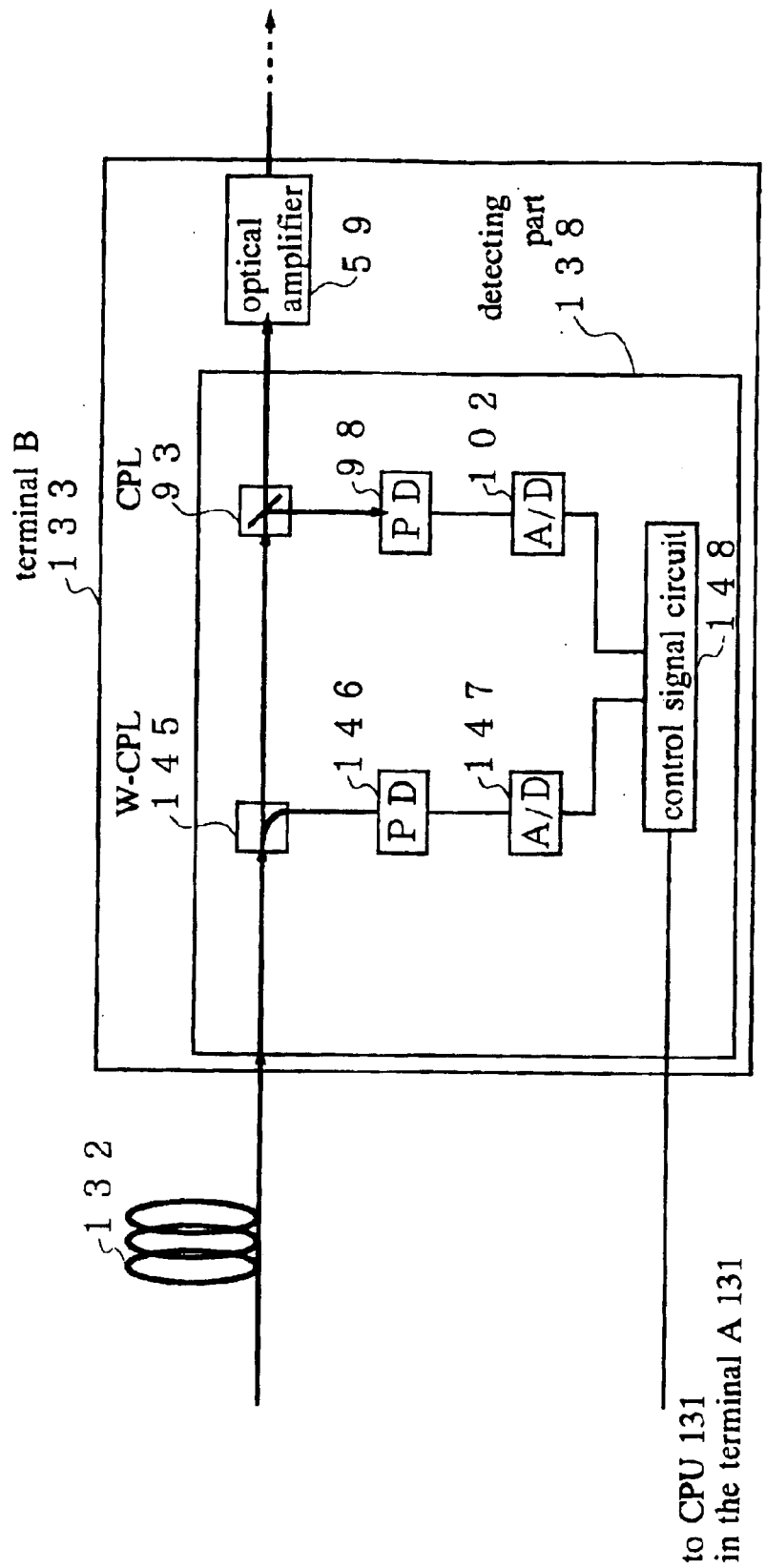
FIG. 12 is a diagram illustrating a structure of the terminal B in the optical communication system of the fourth embodiment.

FIG. 12 is a diagram illustrating a structure of the terminal B in the optical communication system of the fourth embodiment.

Figure 11:
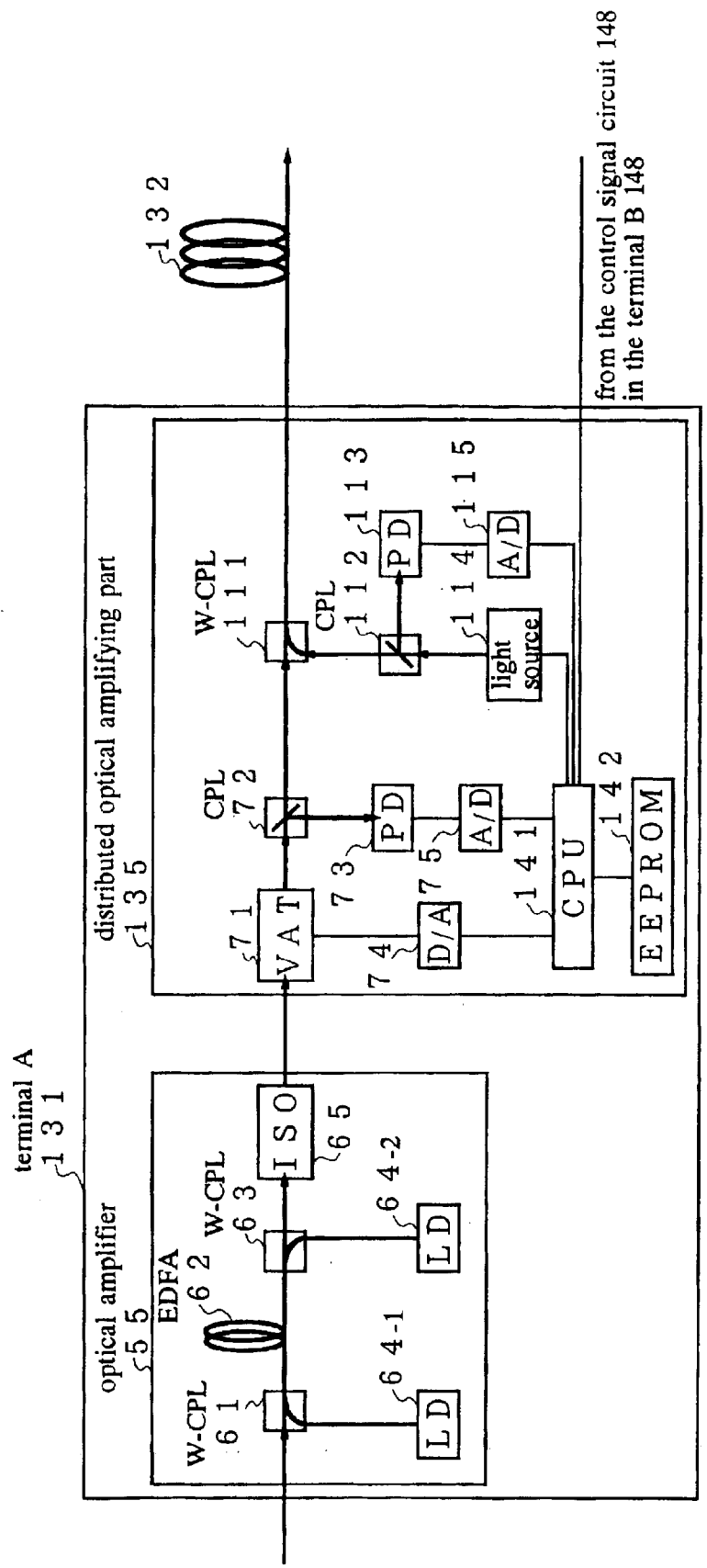
FIG. 11 is a diagram illustrating a structure of the terminal A in the optical communication system of the fourth embodiment.

In FIG. 11 and FIG. 12, the WDM optical signal transmitted from the other terminal is then incident to the terminal A 131. The terminal A 131 processes as explained later the WDM optical signal and then transmits this signal to the optical transmission line 132. The WDM optical signal transmitted through the optical transmission line 132 reaches the terminal B 133.

In FIG. 11, the terminal A 131 is formed with inclusion of the centralized optical amplifier 55 for amplification of light and a distributed optical amplifying part 135 for distributed amplification.

The WDM optical signal incident to the terminal A 131 is then incident to the WDM coupler 61 in the optical amplifier 55 and is then emitted as an output of the optical amplifier 55 via EDF 62, WDM coupler 63 and ISO 65. On the other hand, LD 64-1 supplies the pump light to EDF 62 via the WDM coupler 61, while LD 64-2 supplies the pump light to EDF 62 via the WDM coupler 63.

The WDM optical signal emitted from the optical amplifier 55 is then incident to VAT 71 in the distributed optical amplifying part 135. Attenuation level of VAT 7 is adjusted with CPU 141 via D/A 74. The WDM optical signal adjusted in the optical power with VAT 71 is then incident to the WDM coupler 111 via the coupler 72.

The coupler 72 branches a part of the incident WDM optical signal to PD 73. The branched WDM optical signal is received by PD 73 and is then opto-electrically converted and an output of PD 73 is input to CPU 141 via A/D 75.

CPU 141 determines an optical power of the WDM optical signal according to an output of PD 73.

Moreover, EEPROM 142 as the electrically erasable and programmable non-volatile memory stores the table indicating relationship between excited optical power explained in the first embodiment and the incident optical power and the program required for control of the distributed optical amplifier.

Moreover, the light source 114 generates the pump light for distributed amplification depending on an output of CPU 141 and the pump light is then incident to the WDM coupler 111 via the coupler 112. The coupler 112 branches a part of the pump light and the branched pump light is received with PD 113 and opto-electrically converted. An output of this pump light is then input to CPU 141 via A/D 115.

The WDM coupler 111 wavelength-multiplexes the WDM optical signal and pump light, amplifies the WDM optical signal with the distributed amplifying method and emits the wavelength-multiplexed WDM optical signal and pump light to the optical transmission line 132 for transmission to the terminal B 135.

The WDM optical signal emitted from the terminal A 131 is amplified with the distributed amplification, for example, the Raman amplification method within the optical transmission line 132 and is then incident to the terminal B 133.

Meanwhile, the terminal B 133 is formed with inclusion of a detecting part 138 for detecting the residual pump light and Raman amplifying gain and the optical amplifier 59 for amplifying the light. Here, the optical amplifier 59 is the centralized optical amplifier and the structure thereof is similar to theoptical amplifier 55 and therefore the same explanation will be omitted here.

The WDM optical signal and residual pump light incident to the terminal B 133 are then incident to the WDM coupler 145 in the detecting part 138.

The WDM coupler 145 branches the residual pump light of the pump light for distributed amplification supplied to the optical transmission line 132 within the terminal A 131. The cut-off wavelength (cut-off frequency) of the WDM coupler 145 is set between the wavelength band of the WDM optical signal and the wavelength of the pump light.

The branched residual pump light is received with PD 146 and is then opto-electrically converted. An output of PD 146 is then input to the control signal circuit 148 via A/D 147.

The WDM optical signal emitted from the WDM coupler 145 is then emitted as an output of the detecting part 138 via the coupler 93 and is then incident to the optical amplifier 59.

The coupler 93 branches a part of the WDM optical signal to PD 98. The branched WDM optical signal is received by PD 98 and is then opto-electrically converted. An output of PD 98 is input to the control signal circuit 148 via A/D 102. An output of this PD 98 corresponds to the optical power of WDM optical signal.

The control signal circuit 148 converts the signal to that suitable for transmitting the optical power of the residual pump light judged on the basis of an output of PD 146 and the optical power of the WDM optical signal judged on the basis of an output PD 98 and then transmits this signal to CPU 141 in the terminal A 131.

As the optical transmission line for transmitting this signal, the exclusive physical line, one channel of the WDM optical signal and undefined region in the overhead may be used as in the case of the second embodiment.

(Operation and Effect of Fourth Embodiment)

Following set is performed in the fourth embodiment on the occasion of installing the distributed optical amplifier in the optical communication system.

An installer gives the excited optical power to CPU 141 in the terminal A 131 and drives the program stored in EEPROM 142.

The excited optical power is determined considering the transmission characteristics and transmission distance of the optical transmission line 132.

First, CPU 141 adjusts the attenuation level of VAT 71 to almost zero, while the pump light of the light source 114 to almost zero and transmits the WDM optical signal from the other terminal to the terminal B 133 from the terminal A 131 via the optical amplifier 55, distributed optical amplifying part 135 and optical transmission line 52.

CPU 141 obtains, in this case, an output of PD 98 of the terminal B 133 with the control signal circuit 148. An output of PD 98 is the optical power Pnon of the WDM optical signal when the distributed amplification by the light source 114 is not performed and this optical power is the reference value for calculation of the distributed amplification gain and it is the actually measured loss of the optical transmission line 132 for the signal wavelength.

CPU 141 drives the light source 114 via the control signal circuit 148 and supplies the pump light to the optical transmission line 132. CPU 141 obtains an output of PD 145 and an output of PD 98 via the control signal circuit 148. An output of PD 98, in this case, is an optical power Pdis of the WDM optical signal when the distributed amplification by the light source 114 is performed. CPU 141 subtracts the previous Pnon from this Pram to obtain the difference. This difference is the distributed amplification gain Gdis. Moreover, an output of PD 146 corresponds to the residual excited optical power Prem.

CPU 141 generates a table indicating relationship between the excited optical power and incident optical power using the Expression explained in the first embodiment from actually measured loss of optical transmission line 132 for the signal wavelength, distributed amplification gain Gdis and residual excited optical power Prem. CPU 141 stores this relationship table in EEPROM 142.

CPU 141 adjusts the attenuation level of VAT 71 to attain the incident optical power corresponding to the preset excited optical power by referring to this relationship table. CPU 141 judges whether the corresponding incident optical power is obtained or not on the basis of an output of PD 73 and executes the feedback control for the attenuation level of VAT 71.

If the excited optical power changes after the setting, an installer gives a new excited optical power to CPU 141. CPU 141 drives the light source 114 with the new setting value to update the excited optical power. CPU 141 refers to the relationship table stored in EEPROM 142 on the basis of an output of PD 113 and searches the incident optical power corresponding to this new setting value. CPU 141 adjusts the attenuation level of VAT 71 to obtain the searched incident optical power.

Since the distributed optical amplifier of the fourth embodiment operates as explained above, it can adjust the incident optical power depending on the excited optical power in order to control the non-linear optical effects. Therefore, the optical communication system of the third embodiment can control the waveform deterioration and improve the optical SNR. Therefore, this optical communication system enables ultra long-distance transmission.

Next, another embodiment will be explained.

(Structure of the Fifth Embodiment)

The optical communication system of the fifth embodiment is the optical communication system, as in the case of the first embodiment, for transmitting and receiving the WDM optical signal between a couple of terminals. The distributed optical amplifier is installed in this optical communication system and optically amplifies the WDM optical signal utilizing the optical transmission line as the optical amplifying medium with the bi-directional pumping. Structures of the terminal A 151 and terminal B 153 in this optical communication system and distributed optical amplifier will then be explained.

Figure 13:
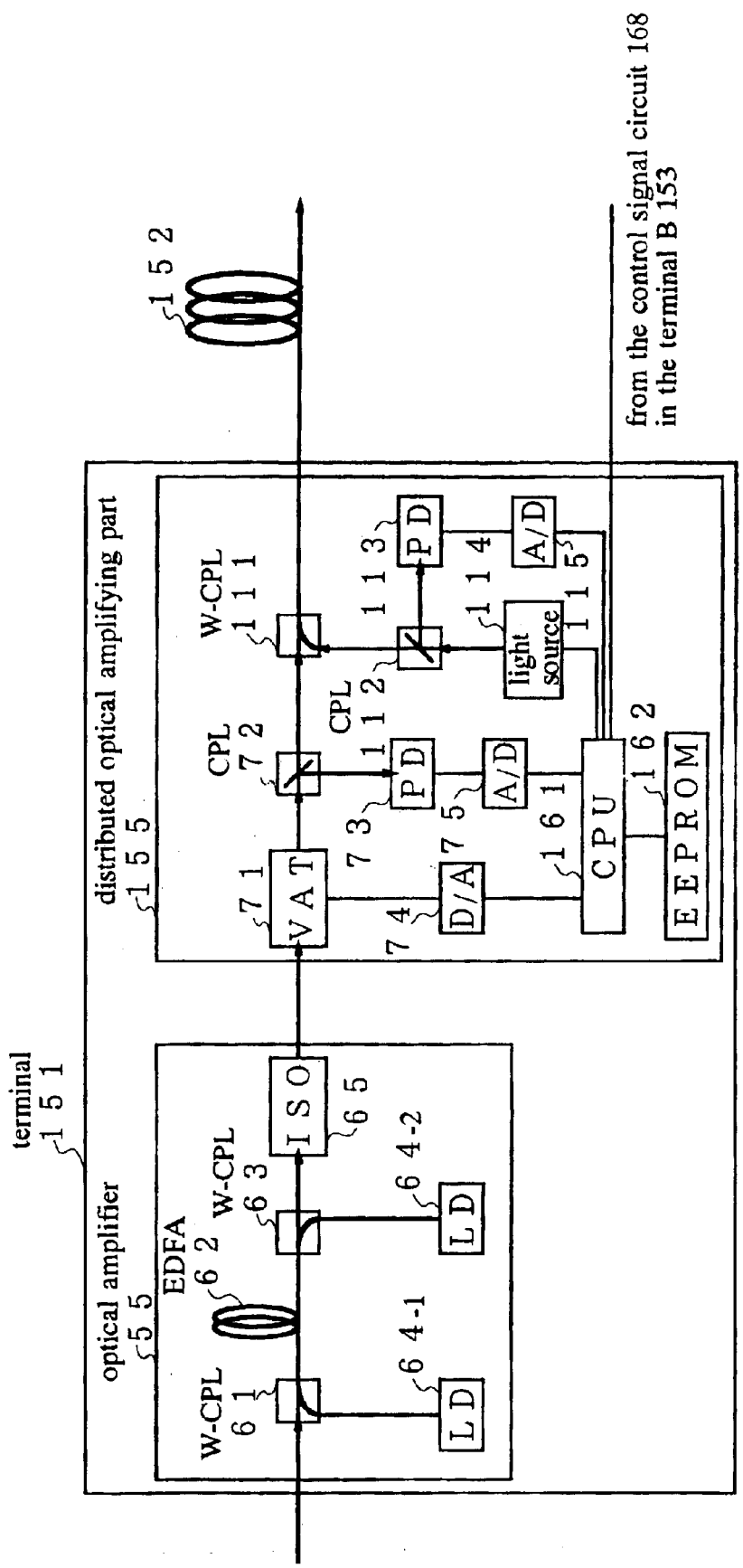
FIG. 13 is a diagram illustrating a structure of the terminal A in the optical communication system of the fifth embodiment.

FIG. 13 is a diagram illustrating a structure of the terminal A in the optical communication system of the fifth embodiment.

Figure 14:
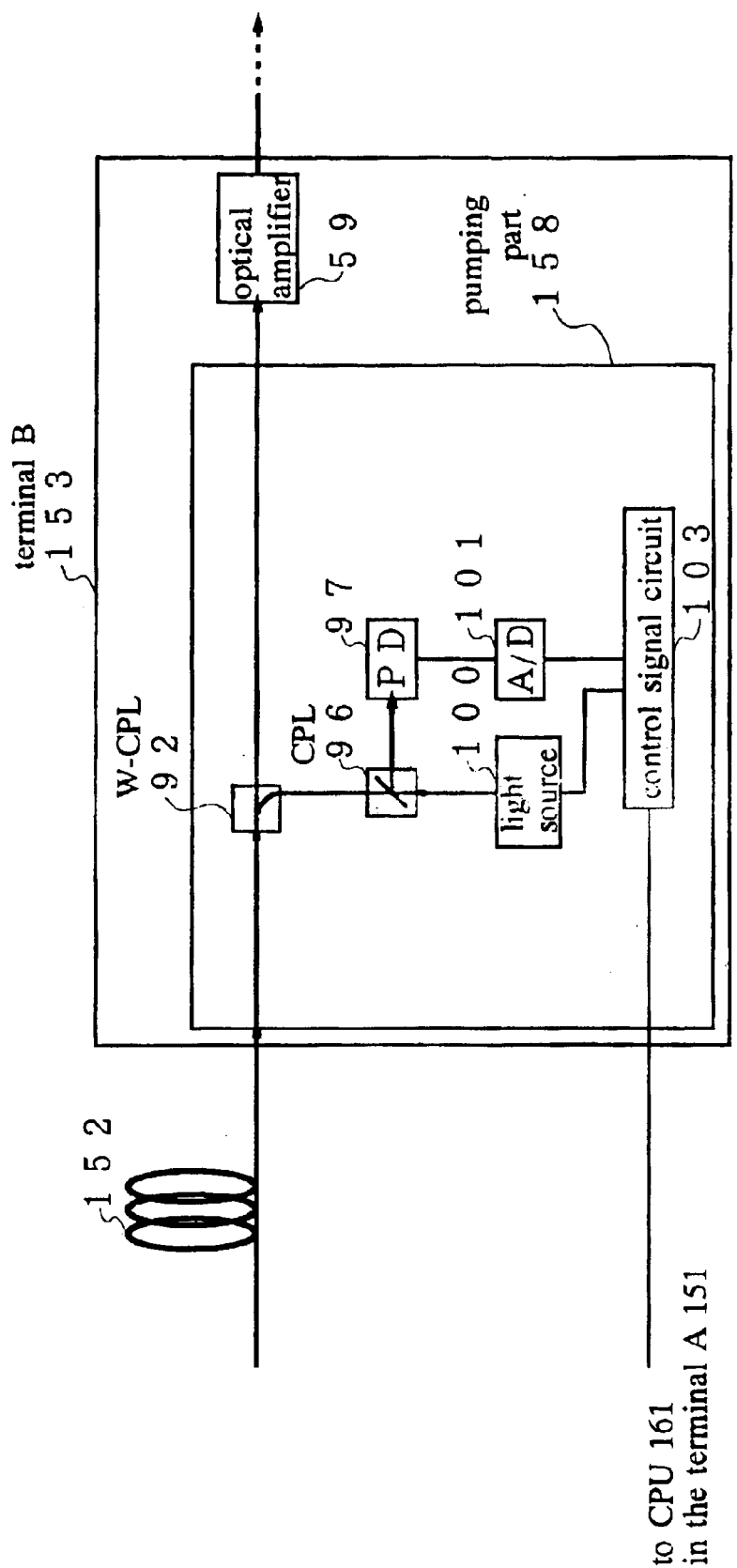
FIG. 14 is a diagram illustrating a structure of the terminal B in the optical communication system of the fifth embodiment.

FIG. 14 is a diagram illustrating a structure of the terminal B in the optical communication system of the fifth embodiment.

In FIG. 13 and FIG. 14, the WDM optical signal transmitted from the other terminal is incident to the terminal A 151. The terminal A 151 processes as will be explained later this WDM optical signal and transmits this signal to the optical transmission line 142. The WDM optical signal transmitted to the optical transmission line 152 is then transmitted to the terminal B 153.

In FIG. 13, the terminal A 151 is formed with inclusion of the centralized optical amplifier 55 for amplifying the light and the distributed optical amplifying part 155 for distributed amplification.

The WDM optical signal incident to the terminal A 151 is then incident to the WDM coupler 51 in the optical amplifier 55 and is then emitted as an output of the optical amplifier 55 via EDF 62, WDM coupler 63 and ISO 65. On the other hand, OD 64-1 supplies the pump light the EDF 62 via the WDM coupler 61, while OD 64-2 supplies the pump light to EDF 62 via the WDM coupler 63.

The WDM optical signal emitted from the optical amplifier 55 is then incident to VAT 71 in the distributed optical amplifying part 155. Attenuation level of VAT 71 is adjusted with CPU 161 via D/A 74. The WDM optical signal adjusted in the optical power with VAT 71 is then incident to the WDM coupler 111 via the coupler 72.

The coupler 72 branches a part of the incident WDM optical signal. The branched WDM optical signal is received by PD 73 and opto-electrically converted. An output of PD 73 is then input to CPU 161 via A/D 75.

CPU 161 judges the optical power of the WDM optical signal on the basis of an output of this PD 73.

Moreover, EEPROM 162 as the electrically erasable and programmable non-volatile memory stores the table indicating relationship between the excited optical power explained in the first embodiment and the incident optical power and the program required to control the distributed optical amplifier. This relationship table is previously generated considering the bi-directional pumping in the manner same as that of the first embodiment.

Moreover, the light source 114 generates the pump light for distributed amplification depending on an output of CPU 161 and the pump light is then incident to the WDM coupler 111 via the coupler 112. The coupler 112 branches a part of the pump light and the branched pump light is received by PD 113 and is opto-electrically converted. An output of this PD 113 is then input to CPU 161 via A/D 115.

The WDM coupler 111 wavelength-multiplexes the WDM optical signal and pump light to amplify the WDM optical signal with the distributed amplification method and also emits the wavelength-multiplexed WDM optical signal and pump light to the optical transmission line 152.

On the other hand, the terminal B 153 is formed with inclusion of the pumping part 158 for supplying pump light for distributed amplification and an optical amplifier 59 for amplifying the light. Here, the optical amplifier 59 is the centralized optical amplifier and since its structure is same as that of the optical amplifier 55, the same explanation is omitted here. The WDM optical signal propagated through the optical transmission line 152 from the terminal A 151 is then incident to the optical amplifier 59 via the WDM coupler 92 in the pumping part 158 and is then optically amplified to the predetermined level. Thereafter, the signal is transmitted to the optical transmission line for transmission to the other terminal.

In the pumping part 158, the light source 100 generates the pump light for distributed amplification depending on an output of CPU 161 input via the control signal circuit 148. Wavelength of the pump light is set corresponding to the wavelength of the light for distributed amplification and physical phenomenon for distributed amplification. The pump light emitted from the light source 100 is incident to the WDM coupler 92 via the coupler 96. The coupler 96 branches a part of the pump light and the branched pump light is then received by PD 97 and then opto-electrically converted. An output of PD 97 is input to the control signal circuit 163 via A/D 101.

The control signal circuit 163 converts the signal to that suitable for transmitting the optical power of the pump light judged on the basis of an output of PD 97 and this signal is transmitted to CPU 161 within the terminal A 151.

As the optical transmission line for transmitting this signal, the exclusive physical line, one channel of the WDM optical signal and undefined region in the overhead may be used as in the case of the second embodiment.

The WDM optical signal emitted from the terminal A 151 is amplified with the pump lights of the light sources 114, 100 within the optical transmission line 152 with the distributed amplification method, for example, the Raman amplification and is then incident to the terminal B 153.

(Operation and Effect of the Fifth Embodiment)

In the fifth embodiment, following settings are executed at the time of installing the distributed optical amplifier in the optical communication system.

An installer gives the excited optical power to CPU 161 in the terminal A 151 to drive the program stored in EEPROM 162.

The excited optical power is determined considering the transmission characteristics and transmission distance of the optical transmission line 102.

CPU 161 drives the light sources 100 and 114 and supplies the pump lights to the optical transmission line 152 from both directions. CPU 161 obtains an output of PD 97 and an output of PD 113 to actually measure the excited optical power.

CPU 161 refers to the relationship table stored in EEPROM 162 according to the actually measured excited optical power and adjusts the attenuation level of VAT 71 to obtain the incident optical power corresponding to the pump light. CPU 161 determines whether the corresponding incident optical power is obtained or not on the basis of an output of PD 73 and executes the feedback control for the attenuation level of VAT 71.

If the excited optical power changes after the setting, an installer gives a new excited optical power to CPU 161. CPU 161 drives the light sources 100 and 114 with the new setting to change the excited optical power. CPU 161 refers to the relationship table stored in EEPROM 162 on the basis of outputs of PD 97 and PD 113 and searches the incident optical power corresponding to such new setting. CPU 161 adjusts the attenuation level of VAT 71 to obtain the searched incident optical power.

Since the distributed optical amplifier in the fifth embodiment operates as explained above, the incident optical power is adjusted depending on the excited optical power and thereby the non-linear optical effects can be controlled. Therefore, the optical communication system of the fifth embodiment can control the waveform deterioration and improve the optical SNR. Accordingly, this optical communication system enables ultra long-distance transmission.

Next, an example of structure of the optical transmitting terminal in the embodiment explained above will then be explained.

Figure 16:
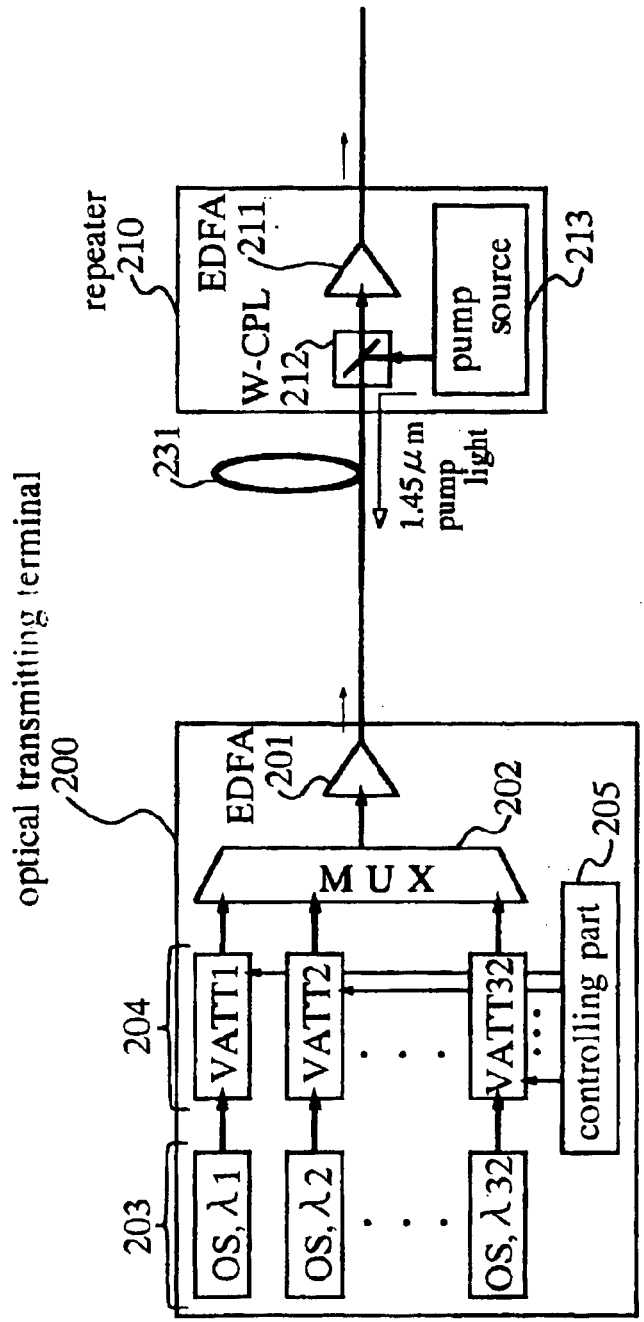
FIG. 16 is a diagram illustrating a first structure example of an optical transmitting terminal.

FIG. 16 is a diagram illustrating an example of the first structure of the optical transmitting terminal.

In FIG. 16, the optical transmitting terminal 200 is formed with inclusion of EDFA 201, optical multiplexer 203, VAT 204, optical transmitter 203 and control part 205.

The optical signal generated by the optical transmitter 203 is incident to VAT 204 for attenuation of optical power. The optical transmitter 203 and VAT 204 of such structures are provided in a plural number corresponding to each channel. Adjustment of attenuation level in each VAT 204 is controlled by the control part 205.

Each optical signal emitted from each VAT 204 is wavelength-multiplexed in the optical multiplexer 202 to become the WDM optical signal. This WDM optical signal is amplified in the centralized manner and is then transmitted to the optical transmission line 231. The WDM optical signal transmitted from the optical transmission line 231 is then incident to EDFA 211 via the optical multiplexer 212 in the repeater 210 of the next stage.

Meanwhile, the pump light emitted from the pump light source 213 in the repeater 213 is then incident to the transmission optical 231 with the optical multiplexer 212 to amplify the WDM optical signal transmitted through the transmission optical 231.

Such optical transmitting terminal 200 can adjust the optical power of optical signal of each channel with each VAT 204.

Figure 17:
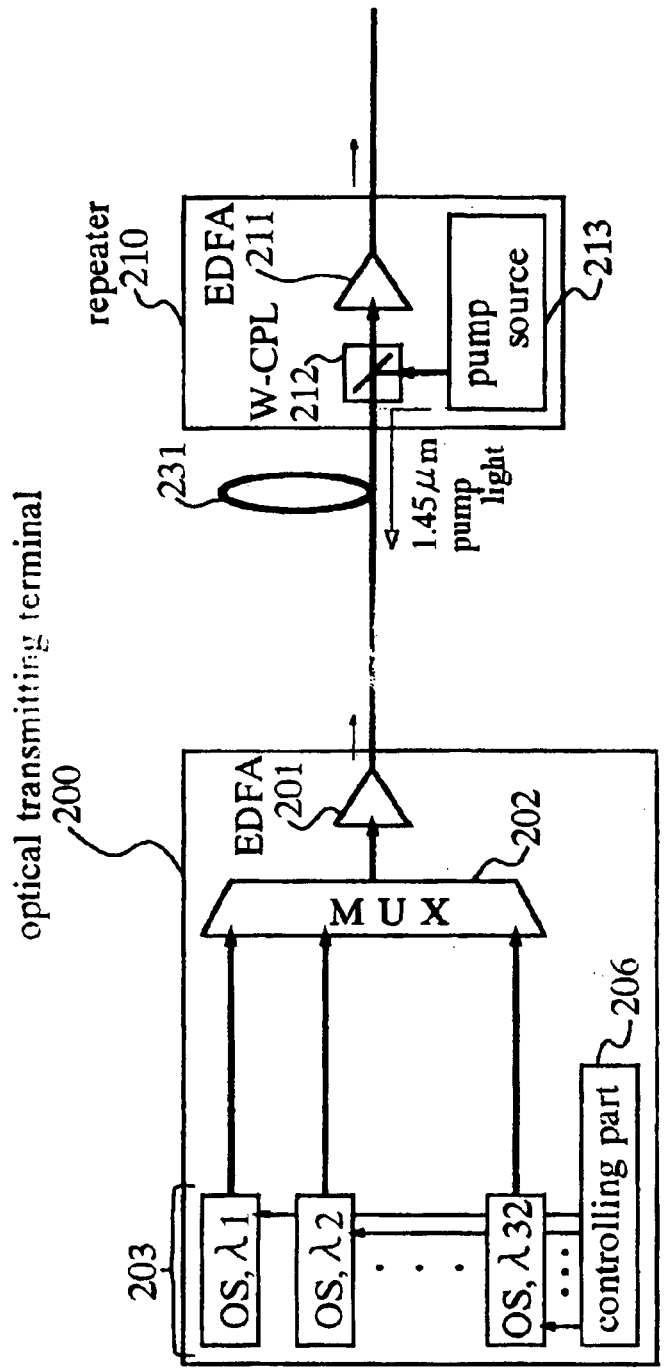
FIG. 17 is a diagram illustrating a second structure example of the optical transmitting terminal.

FIG. 17 is a diagram illustrating a second example of structure of the optical transmitting terminal.

In FIG. 17, the optical transmitting terminal 200 is formed with inclusion of EDFA 201, optical multiplexer 203, optical transmitter 203 and control part 206.

Each optical signal generated with each optical transmitter 203 is incident to an optical multiplexer 202 and is then wavelength-multiplexed to become the WDM optical signal. The optical transmitter 203 is provided in plural number corresponding to each channel. The WDM optical signal is amplified with the predetermined gain. This gain can be adjusted with the control part 206.

The amplified WDM optical signal is transmitted to the optical transmission line 231, amplified with the pump light supplied from the repeater 210 of the next stage as in the case of the first structure example and is then incident to the multiplexer 212 in this repeater 210.

Such optical transmitter 200 amplifies at a time the WDM optical signals with EFDA 201 to adjust the optical power thereof.

Figure 18:
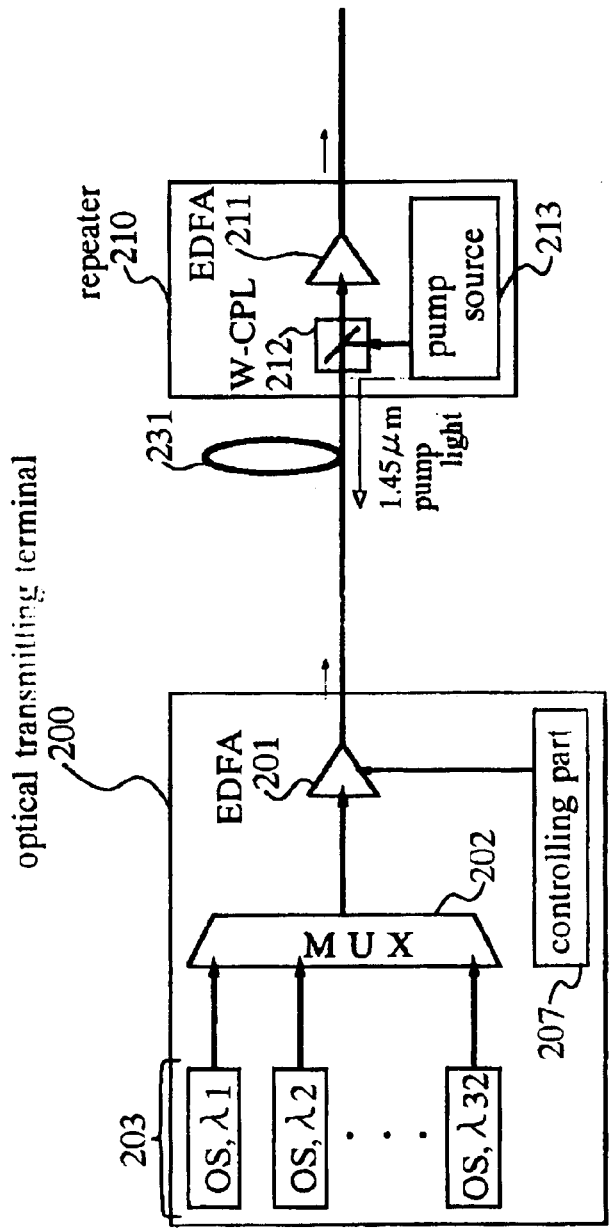
FIG. 18 is a diagram illustrating a third structure example of the optical transmitting terminal.

FIG. 18 is a diagram illustrating a third example of structure of the optical transmitting terminal.

In FIG. 18, the optical transmitting terminal 200 is formed with inclusion of EDFA 201, optical multiplexer 202, optical transmitter 203 and control part 207.

Each optical signal generated in each optical transmitter 203 is incident to the optical multiplexer 202 and wavelength-multiplexed to become the WDM optical signal. The optical transmitter 203 is provided in plural number corresponding to each channel. The WDM optical signal is amplified with the predetermined gain in EFDA 210.

Here, the optical transmitter 203 is formed, for example, with inclusion of LD and optical modulator. An output power of LD is controlled with the control part 207. Moreover, for example, the optical transmitter 203 is formed with inclusion of LD, optical modulator and semiconductor laser amplifier and the gain of the semiconductor laser amplifier is controlled with the control part 207.

The amplified WDM optical signal is transmitted to the optical transmission line 231, amplified with the pump light supplied from the repeater 210 of the next stage as in the case of the first structure example explained above and is then incident to the multiplexer 212 in the repeater 210.

Such optical transmitting terminal 200 can adjust the optical power of each optical signal emitted from each optical transmitter with the control part 207. Therefore, the optical power of optical signal of each channel can be adjusted.

A degree of adjustment with the control parts 205, 206, 207 in these first to third structure examples may be obtained by referring to the predetermined relationship table as in the case of the first embodiment. Moreover, it is also possible to generate and obtain the relationship table by obtaining the information such as residual pump light from the terminal of the subsequent stages as in the case of the second embodiment. In addition, it is also possible to obtain such degree of adjustment through the optical transmission line by preparing the relationship table in the terminal for monitoring the optical communication system in the centralized manner.

In the second and fourth embodiments, the relationship table is generated from the distributed amplification gain Gdis and residual excited optical power Prem, but such relationship table can be generated from any one value in the case where the optical communication system using the distributed optical amplifier of the present invention has a larger error rate. In addition, the optical communication system has still larger error rate, it is also possible that these values are not used, an installer prepares the relationship table, this relationship table is stored in EEPROM 77 and reference is made to this stored relationship table.

Moreover, in the second and fourth embodiments, CPU 76 generates the relationship table from the actually measured values, but the following method is also possible that a plurality of relationship tables are prepared for each values of different residual excited optical power Prem and distributed amplification gain Gdis and a plurality of relationship tables are stored in EEPROM 77. CPU 76 is also capable of selecting the relationship table corresponding to these values according to the measured residual excited optical power Prem and distributed amplification gain Gdis.

In the second and fourth embodiments, CPU 76 generates the relationship table at the time of installation and stores this table in EEPROM 77 and uses the previously stored relationship table for adjustment thereof including the adjustment of the first incident optical power. But, it is also possible that CPU 76 generates the relationship table each time when the excited optical power is changed.

Moreover, in the second to fifth embodiments, the incident optical power is adjusted with VAT 71, but VAT 71 can be substituted with the centralized optical amplifier, for example, semiconductor laser amplifier and rare-earth added optical fiber amplifier. Moreover, it is also possible to combine the centralized optical amplifier and optical attenuator in place of VAT 71. In addition, adjustment of incident optical power with VAT 71 can be substituted with use of an optical amplifier 55. In this case, CPU has a structure to control LD 64.

The invention is not limited to the above embodiments and various modifications may be made without departing from the spirit and scope of the invention. Any improvement may be made in part or all of the components.

What is claimed is:

1. A distributed optical amplifying method, comprising:
   preparing an optical transmission line between two terminals, to perform distributed optical amplification;
   supplying a pump light to the optical transmission line;
   detecting an optical power of the pump light;
   detecting an optical power of residual pump light after transmission through the optical transmission line by the pump light;
   adjusting an incident power of the light amplified with the optical transmission line; and
   adjusting an incident optical power of the light according to a correspondence relationship between predetermined incident optical power, depending on output of said pump light detecting, and incident optical power, depending on output of said pump light detecting.

2. An optical communication system for transmitting an optical signal between a couple of terminals, comprising:
   an optical transmission line between a first terminal and a second terminal, transmitting the optical signal and performing distribution amplification;
   light supplying means, provided at the first terminal, for supplying a pump light to the optical transmission line;
   pump light detecting means, provided at the first terminal, for detecting optical power of the pump light;
   residual pump light detecting means for detecting optical power of residual pump light after transmission of the optical signal by the pump light;
   adjusting means, provided at the second terminal, for adjusting incident power of the light amplified with the optical transmission line; and
   control means, provided at the second terminal, for adjusting incident optical power of the light according to a correspondence relationship between predetermined incident optical power, depending on output of the pump light detecting means, and incident optical power, depending on output of the pump light detecting means.

3. An optical communication system, comprising:
   a transmitting terminal outputting a wavelength-multiplexed optical signal;
   an optical transmission line transmitting the optical signal from the transmitting terminal and performing distribution amplification;

a receiving terminal receiving the optical signal through the optical transmission line;

light supplying means, provided at the receiving terminal, for supplying pump light to the optical transmission line;

pump light detecting means, provided at the receiving terminal, for detecting optical power of the pump light;

adjusting means, provided at the transmitting terminal, for adjusting incident power of the light amplified at the optical transmission line;

control means, provided at the transmission terminal, for adjusting incident optical power of the light according to the correspondence relationship between predetermined incident optical power, depending on output of the pump light detecting means, and the incident optical power, depending on output of the pump light detecting means; and pumping means for inserting a pump light for pumping the optical transmission line to the output end side of the optical transmission line to perform stimulated Raman amplification in the optical transmission line, wherein optical power of the optical signal output from the transmitting terminal is set to a value less than a value that actually generates crosstalk by four-wave mixing at the output end of the optical transmission line.

4. The optical communication system according to claim 3, wherein optical power of the optical signal output from the transmitting terminal is set to a value less than a value that actually generates stimulated Brillouin scattering in the optical transmission line.

5. The optical communication system according to claim 3, wherein the optical power of the pump light from the pumping means is set to a value resulting in the best signal to noise ratio.

6. An optical communication system, comprising:

a transmitting terminal outputting a wavelength-division multiplexed optical signal;

an optical transmission line transmitting the optical signal from the transmitting terminal and performing distribution amplification;

a receiving terminal receiving the optical signal through the optical transmission line;

light supplying means, provided at the receiving terminal, for supplying pump light to the optical transmission line;

pump light detecting means, provided at the receiving terminal, for detecting optical power of the pump light;

adjusting means, provided at the transmitting terminal, for adjusting incident power of the light amplified at the optical transmission line;

control means, provided at the transmission terminal, for adjusting incident optical power of the light according to the correspondence relationship between predetermined incident optical power, depending on output of said pump light detecting means, and said incident optical power, depending on output of said pump light detecting means; and pumping means for inserting a pump light for pumping the optical transmission line to the output end side of the optical transmission line to perform stimulated Raman amplification in the optical transmission line, wherein optical power of the optical signal output from the optical transmitting terminal is set to a value less than a value that actually generates the predetermined waveform deterioration due to cross-phase modulation at the output end of the optical transmission line.

7. The optical communication system according to claim 6, wherein the optical power of the optical signal output from the transmitting terminal is set to a value less than a value that actually generates stimulated Brillouin scattering in the optical transmission line.

8. The optical communication system according to claim 7, wherein the optical power of the pump light from the pumping means is set to a value resulting in the best signal to noise ratio.

9. The optical communication system according to claim 3, wherein the pumping means is provided at a repeater connected to the optical transmission line.

10. The optical communication system according to claim 6, wherein the pumping means is provided at a repeater connected to the optical transmission line.

11. The optical communication system according to claim 3, wherein the pumping means is provided at a receiving terminal connected to the optical transmission line.

12. The optical communication system according to claim 6, wherein the pumping means is provided at a receiving terminal connected to the optical transmission line.

13. An optical communication system, comprising:

a transmitting terminal;

a transmitting terminal outputting a wavelength-division multiplexed optical signal;

an optical transmission line transmitting the optical signal from the transmitting terminal and performing distribution amplification;

a receiving terminal receiving the optical signal through the optical transmission line;

light supplying means, provided at the receiving terminal, for supplying pump light to the optical transmission line;

pump light detecting means, provided at the receiving terminal, for detecting optical power of pump light;

adjusting means, provided at the transmitting terminal, for adjusting incident power of the light amplified at the optical transmission line;

control means, provided at the transmission terminal, for adjusting incident optical power of the light according to the correspondence relationship between predetermined incident optical power, depending on output of the pump light detecting means, and the incident optical power, depending on output of the pump light detecting means; and pumping means for inserting pump light for pumping the optical transmission line to the output end side of the optical transmission line to perform stimulated Raman amplification in the optical transmission line, wherein optical power of the light output from the transmitting terminal is set to a value less than a value that actually generates stimulated Brillouin scattering.

14. The optical communication system according to claim 13, wherein optical power of the optical signal output from the transmitting terminal is set to a value less than a value that actually generates crosstalk by four-wave mixing at the output end of the optical transmission line.

15. The optical communication system according to claim 13, wherein the optical power of the pump light from the pumping means is set to a value resulting in the best signal to noise ratio.

* * * * *

UNITED STATES PATENT AND TRADEMARK OFFICE
CERTIFICATE OF CORRECTION

PATENT NO. : 6,862,134 B2
DATED : March 1, 2005
INVENTOR(S) : Takafumi Terahara et al.

It is certified that error appears in the above-identified patent and that said Letters Patent is hereby corrected as shown below:

Title page,
Item [56], References Cited, OTHER PUBLICATIONS, change "R. Ohhira et al., "40 Gbit/s X 8-ch NRZ WDM Transmission Experiment Over 80 km X 5-Span Using Distributed Raman Amplification in RDF", 25th European Conference On Optical Communication (ECOC'99), September 26-30, 1999, pages ll-176-ll177, XP001035427, Nice, France" to
-- R. Ohhira et al. "40 Gbit/s X 8-ch NRZ WDM Transmission Experiment Over 80 km X 5-Span Using Distributed Raman Amplification in RDF", 25th European Conference On Optical Communication (ECOC'99), September 26-30, 1999, pages ll-176-ll-177, XP001035427, Nice, France --.

Signed and Sealed this

Thirtieth Day of August, 2005

JON W. DUDAS
*Director of the United States Patent and Trademark Office*